(12) United States Patent
Masuko

(10) Patent No.: US 8,949,267 B2
(45) Date of Patent: Feb. 3, 2015

(54) INFORMATION PROCESSING DEVICE, INFORMATION PROCESSING METHOD, AND RECORDING MEDIUM THAT HAS RECORDED INFORMATION PROCESSING PROGRAM

(75) Inventor: Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/580,880

(22) PCT Filed: Feb. 28, 2011

(86) PCT No.: PCT/JP2011/054527
§ 371 (c)(1),
(2), (4) Date: Feb. 1, 2013

(87) PCT Pub. No.: WO2011/105607
PCT Pub. Date: Sep. 1, 2011

(65) Prior Publication Data
US 2013/0188872 A1    Jul. 25, 2013

(30) Foreign Application Priority Data

Feb. 26, 2010  (JP) ................ P2010-043468
Feb. 26, 2010  (JP) ................ P2010-043469
Aug. 31, 2010  (JP) ................ P2010-194410
Aug. 31, 2010  (JP) ................ P2010-194422
Aug. 31, 2010  (JP) ................ P2010-194431

(51) Int. Cl.
*G06F 17/30*     (2006.01)
*G06K 9/18*      (2006.01)

(52) U.S. Cl.
CPC ............ *G06K 9/18* (2013.01); *G06F 17/30253* (2013.01)
USPC .......................................... 707/769; 382/229

(58) Field of Classification Search
USPC ........................................ 707/769; 382/229
See application file for complete search history.

(56) References Cited

U.S. PATENT DOCUMENTS 7,574,044 B2 *   8/2009   Hayashi et al. ............... 382/176
8,363,939 B1 *   1/2013   Khosla et al. ................. 382/173

(Continued)

FOREIGN PATENT DOCUMENTS

| CN | 101309383 A | 11/2008 |
| JP | 8-305722 A | 11/1996 |

(Continued)

OTHER PUBLICATIONS

Singhal, Amit, Gerard Salton, and Chris Buckley. Length normalization in degraded text collections. Cornell University, 1995.*

(Continued)

*Primary Examiner* — William Spieler
(74) *Attorney, Agent, or Firm* — Sughrue Mion, PLLC

(57) ABSTRACT

An appropriate search is carried out even with images including a complicated layout structure, decorated characters, and so on. An image search device 10 is provided with an image database 11 to store an image as a search target, a character string region extraction unit 13 to extract a character string region including a character string in the image, a character candidate recognition unit 14 to specify a plurality of character candidates through execution of character recognition from the image, for each of characters forming the character string in the character string region, a character candidate storage unit 15 to store the plurality of character candidates in the sequence of the character string in correspondence with the image as the specifying origin of the character candidates, a search keyword input unit 17 to input a search keyword, a search unit 18 to perform a search to determine whether each of characters forming the search keyword matches any of the plurality of character candidates for the character string, and an output unit 19 to output the result of the search.

21 Claims, 16 Drawing Sheets

(56) References Cited

U.S. PATENT DOCUMENTS

| | | | |
|---|---|---|---|
| 8,442,813 B1* | 5/2013 | Popat | 704/9 |
| 2001/0047373 A1 | 11/2001 | Jones et al. | |
| 2002/0041713 A1 | 4/2002 | Imagawa et al. | |
| 2003/0177115 A1* | 9/2003 | Stern et al. | 707/4 |
| 2008/0222095 A1* | 9/2008 | Ii | 707/3 |
| 2008/0284863 A1 | 11/2008 | Fujiwara | |
| 2008/0304740 A1* | 12/2008 | Sun et al. | 382/168 |
| 2009/0030882 A1 | 1/2009 | Wu et al. | |
| 2009/0193334 A1* | 7/2009 | Assadollahi | 715/261 |
| 2010/0272359 A1* | 10/2010 | Fosseide et al. | 382/182 |
| 2010/0303342 A1* | 12/2010 | Berg et al. | 382/155 |
| 2012/0081565 A1 | 4/2012 | Fujiwara | |
| 2012/0128251 A1* | 5/2012 | Petrou et al. | 382/182 |

FOREIGN PATENT DOCUMENTS

| | | |
|---|---|---|
| JP | 10-177641 A | 6/1998 |
| JP | 2001-337993 A | 12/2001 |
| JP | 2002-63197 A | 2/2002 |
| JP | 2004-206520 A | 7/2004 |
| JP | 2008-288898 A | 11/2008 |
| JP | 2009-282883 A | 12/2009 |
| JP | 2009-295104 A | 12/2009 |
| JP | 2010-39533 A | 2/2010 |

OTHER PUBLICATIONS

Weinberger, TinEye's reverse image search, 2008.*

Arica, Nafiz, and Fatos T. Yarman-Vural. Optical character recognition for cursive handwriting. Pattern Analysis and Machine Intelligence, IEEE Transactions on 24.6 (2002).*

Zhen-Xue Chen et al., "Automatic License—Plate Location and Recognition Based on Feature Salience, IEEE Transactions on Vehicular Technology ,vol. 58,No. 7", Sep. 2009, p. 3781-p. 3785.

Koen Deschacht et al., "Finding the Best Picture: Cross-Media Retrieval of Content", Proceedings of the 30th European Conference on Information Retrieval Glasgow, Mar.-Apr. 2008, p. 1-p. 8.

Non-Final Office Action issued in corresponding U.S. Appl. No. 13/580,789 dated Nov. 27, 2013.

Japanese Office Action dated Apr. 8, 2014 issued in counterpart application No. 2011-042642.

Nakai, Tomohiro, et al., "Document Image Retrieval Based on Cross-Ratio and Hashing", The Institute of Electronics, Information and Communication Engineers, Japan, vol. 104, No. 742, Mar. 11, 2005. p. 103-108.

Japanese Office Action of JP2012-501908 issued Aug. 14, 2012.

Nobuyuki Otsu, "An Automatic Threshold Selection Method Based on Discriminant and Least Squares Criteria", IEICI Transations on Information and Systems, 1980, pp. 349-356, vol. J63-D, No. 4.

Kazuki Ashida et al., "Extraction of Characters from Scene Images", IEICE Transations on Information and Systems, 2004, pp. 43-48, vol. J88-D2, No. 9.

Ning Sun et al., "Printed Character Recognition Using Directional Element Feature", IEICE Transations on Information and Systems, 1991, pp. 330-339, vol. J74-D2, No. 3.

Hiroyuki Hase et al., "Consideration of Color Segmentation to Extract Character Areas from Color Document Images", IEICE Transations on Information and Systems, 2000, pp. 1294-1304, vol. J83-D2, No. 5.

International Search Report for PCT/JP2011/054527 dated Apr. 5, 2011.

Chinese Office Action dated May 26, 2014, issued in counterpart patent application No. 201180010551.0.

Doermann, D. "The Indexing and Retrieval of Document Images: A Survey", Computer Vision and Image Understanding, Academic Press, Jun. 1, 1998, p. 287-298, vol. 70, No. 3, XP004448875, ISSN: 1077-3142, DOI:10.1006/ CVIU.1998.0692.

Supplementary European Search Report dated Sep. 11, 2014 issued in corresponding European Patent Application No. 11 74 7561.6.

Supplementary European Search Report dated Sep. 12, 2014 issued in corresponding European Patent Application No. 11 74 7562.4.

* cited by examiner

Fig. 2

| No.j | CHARACTER COORDINATES | RECOGNITION RESULT (n=1-30 IN ORDER OF CHARACTER CANDIDATES) |
|---|---|---|
| 1 | 200,326,21,26 | (illegible character list) |
| 2 | 228,326,25,26 | (illegible character list) |
| 3 | 258,326,27,26 | (illegible character list) |
| 4 | 290,326,26,26 | (illegible character list) |
| 5 | 321,326,27,26 | (illegible character list) |
| 6 | 354,326,18,26 | (illegible character list) |
| 7 | 379,326,26,26 | (illegible character list) |
| 8 | 411,326,25,26 | (illegible character list) |
| 9 | 442,326,26,26 | (illegible character list) |
| 10 | 474,326,26,26 | (illegible character list) |
| 11 | 506,326,17,26 | (illegible character list) |
| 12 | 530,326,24,26 | (illegible character list) |
| 13 | 559,326,16,26 | (illegible character list) |

Fig. 4

| LIGHTNESS DIFFERENCE | Character size | | |
|---|---|---|---|
| | 20 pt or below | 20 pt - 30 pt | 30 pt or above |
| 124 or below | low | low | medium |
| 125-157 | low | medium | high |
| 158 or above | medium | high | high |

Fig. 11

| Search keyword | Visual check result (number of images) | Search result | | Recall | Precision | F-measure |
|---|---|---|---|---|---|---|
| | | correct (number of images) | incorrect (number of images) | | | |
| cell | 60 | 21 | 0 | 0.35 | 1.00 | 0.52 |
| fat | 6 | 3 | 1 | 0.5 | 0.75 | 0.6 |
| hair removal | 6 | 3 | 2 | 0.5 | 0.6 | 0.55 |
| rejuvenation | 8 | 4 | 0 | 0.50 | 1.00 | 0.67 |
| pharmaceutical | 23 | 5 | 0 | 0.22 | 1.00 | 0.36 |
| pollen allergy | 3 | 3 | 0 | 1.00 | 1.00 | 1.00 |
| antioxidant ability | 8 | 1 | 0 | 0.13 | 1.00 | 0.22 |
| vitamin | 9 | 4 | 0 | 0.44 | 1.00 | 0.62 |
| allergy | 6 | 3 | 0 | 0.50 | 1.00 | 0.67 |
| anti-allergy | 2 | 1 | 0 | 0.50 | 1.00 | 0.67 |
| lift of breasts | 31 | 9 | 0 | 0.29 | 1.00 | 0.45 |
| reduction of cellulite | 1 | 1 | 0 | 1.00 | 1.00 | 1.00 |
| anti-aging | 12 | 5 | 0 | 0.41 | 1.00 | 0.59 |
| anti-metabolic syndrome | 1 | 1 | 0 | 1.00 | 1.00 | 1.00 |

Fig. 13

| No. | similarity | saliency | tf | score α=0.0 | α=0.2 | α=0.4 | α=0.6 | α=0.8 | α=1.0 |
|---|---|---|---|---|---|---|---|---|---|
| ① | 1.00 / 1.00 | 1.00 / 1.00 | 2 | 2.00 | 2.00 | 2.00 | 2.00 | 2.00 | 2.00 |
| ② | 1.00 / 1.00 | 1.00 / 0.75 | 2 | 2.00 | 1.90 | 1.81 | 1.72 | 1.64 | 1.56 |
| ③ | 1.00 / 1.00 | 0.75 / 0.75 | 2 | 2.00 | 1.80 | 1.62 | 1.45 | 1.28 | 1.13 |
| ④ | 1.00 / 1.00 | 1.00 / 0.75 | 1 | 1.00 | 1.00 | 1.00 | 1.00 | 1.00 | 1.00 |
| ⑤ | 1.00 / 1.00 | 0.75 / 0.75 | 1 | 1.00 | 0.90 | 0.81 | 0.72 | 0.64 | 0.56 |
| ⑥ | 1.00 / 1.00 | 0.75 / 0.75 | 2 | 2.00 | 1.80 | 1.62 | 1.45 | 1.28 | 1.13 |
| ⑦ | 0.71 / 0.71 | 1.00 / 1.00 | 2 | 1.01 | 1.18 | 1.36 | 1.56 | 1.77 | 2.0 |
| ⑧ | 1.00 / 0.71 | 1.00 / 1.00 | 2 | 1.50 | 1.59 | 1.68 | 1.78 | 1.89 | 2.0 |
| ⑨ | 1.00 / 1.00 | 0.75 / 1.00 | 1 | 1.00 | 0.90 | 0.81 | 0.72 | 0.64 | 0.56 |
| ⑩ | 0.71 | 1.00 | 1 | 0.50 | 0.59 | 0.68 | 0.78 | 0.89 | 1.00 |

*Fig.16*

| |
|---|
| その安全性と品質の高さから |
| 安全性 |
| 品質 |
| 安全性の高さ |
| 品質の高さ |
| 安全性と品質の高さ |
| ⋮ |

INFORMATION PROCESSING DEVICE, INFORMATION PROCESSING METHOD, AND RECORDING MEDIUM THAT HAS RECORDED INFORMATION PROCESSING PROGRAM

CROSS REFERENCE TO RELATED APPLICATIONS

This application is a National Stage of International Application No. PCT/JP2011/054527 filed Feb. 28, 2011, claiming priority based on Japanese Patent Application Nos. 2010-043468 filed Feb. 26, 2010, 2010-043469 filed Feb. 26, 2010, 2010-194410 filed Aug. 31, 2010, 2010-194422 filed Aug. 31, 2010 and 2010-194431 filed Aug. 31, 2010, the contents of all of which are incorporated herein by reference in their entirety.

TECHNICAL FIELD

The present invention relates to an information processing device, an information processing method, and a recording medium that has recorded an information processing program, which are associated with an image search.

BACKGROUND ART

A conceivable search method for an image is, for example, to convert a character string in the image into a text character string and carry out a search for the text character string. A technology to convert a character string in an image into a text character string is, for example, the one to perform character recognition as described in Patent Literature 1.

CITATION LIST

Patent Literature

Patent Literature 1: Japanese Patent Application Laid-open No. 2001-337993

SUMMARY OF INVENTION

Technical Problem

However, the above-described conventional technology can cause many recognition errors in the character recognition with images including a complicated layout structure and/or decorated characters (font).

The present invention has been accomplished in view of the above circumstances and it is an object of the present invention to provide an information processing device, an information processing method, and a recording medium that has recorded an information processing program, which are capable of performing an appropriate search even for images including the complicated layout structure, decorated characters, and so on.

Solution to Problem

In order to achieve the above object, an information processing device according to the present invention is one comprising: an image database for storing an image as a search target; character string region extraction means for extracting a character string region including a character string in the image stored in the image database; character candidate recognition means for specifying a plurality of character candidates through execution of character recognition from the image, for each of characters forming the character string in the character string region extracted by the character string region extraction means; and character candidate storage means for storing the plurality of character candidates specified by the character candidate recognition means, in the sequence of the character string in correspondence with the image as the specifying origin of the character candidates.

The information processing device according to the present invention is configured to recognize each of the characters of the character string in the image and store the plurality of character candidates for each character. Then the stored information is used to perform such a search as to determine whether each character of a search keyword matches any of the character candidates. Therefore, the information processing device according to the present invention is able to determine that the keyword is included in the character string in the image, if the characters of the keyword for the search match the character candidates. This allows the information processing device according to the present invention to perform the appropriate search even in the case where it is difficult to uniquely recognize each of the characters forming the character string in the image because the image as the search target is, for example, an image including the complicated layout structure, decorated characters, or the like.

Preferably, the information processing device further comprises: search keyword input means for inputting a search keyword; search means for performing a search to determine whether each of characters forming the keyword input by the keyword input means matches any of the plurality of character candidates for the character string stored by the character candidate storage means, in the sequence of the keyword; and output means for outputting the result of the search by the search means, based on the correspondence between the character candidates and the image stored by the character candidate storage means. This configuration enables secure execution of the search using the information stored by the character candidate storage means.

Preferably, the character candidate recognition means evaluates correctness of the character recognition on each of the character candidates specified in the character recognition, the character candidate storage means stores the character candidates, based on information indicative of the correctness evaluated by the character candidate recognition means, the search means is configured so that when each of the characters forming the keyword matches any of the plurality of character candidates stored by the character candidate storage means, the search means evaluates reliability on the match from the information indicative of the correctness, and the output means outputs the result of the search, also based on the reliability. This configuration enables the output of the search result according to the reliability of the search, based on the correctness of the recognition of each of the characters forming the character string in the image. Namely, the device is able to provide the output of the search result more convenient to users.

Preferably, the search means determines a number of character candidates to be judged on the match with the keyword, according to a number of the characters of the keyword, and determines character candidates to be judged on the match with the keyword, from the information indicative of the correctness on the character candidates. This configuration enables more appropriate execution of the image search according to the number of characters of the search keyword.

Preferably, the search means calculates a score value of an image including the character candidates for the keyword, from the result of the search on the match between the keyword and the character candidates, and the output means outputs the result of the search by the search means according to the score value. This configuration enables execution of the output of the search result more convenient to users.

In order to achieve the above object, another information processing device according to the present invention is one comprising: an image database for storing an image as a search target; character string region extraction means for extracting a character string region including a character string in the image stored in the image database; character candidate recognition means for specifying a plurality of character candidates through execution of character recognition from the image, for each of characters forming the character string in the character string region extracted by the character string region extraction means; and character candidate storage means for storing a character string consisting of a combination of some of the plurality of character candidates specified by the character candidate recognition means, in correspondence with the image as the specifying origin of the character candidates.

When the information processing device is configured to store the character string consisting of the combination of character candidates as information for the search as in the above configuration, it is also able to perform the appropriate search even in the case where it is difficult to uniquely recognize each of the characters forming the character string in the image because the image as the search target is, for example, an image including the complicated layout structure, decorated characters, or the like. The search processing can be performed at higher speed because the search can be carried out by making determination on the match of a search keyword with the character string consisting of the combination of some of the character candidates.

Preferably, the information processing device further comprises: search keyword input means for inputting a search keyword; search means for performing a search to determine whether each of characters forming the keyword input by the keyword input means matches any of character strings stored by the character candidate storage means, in the sequence of the keyword; and output means for outputting the result of the search by the search means, based on the correspondence between the character string and the image stored by the character candidate storage means. This configuration enables secure execution of the search using the information stored by the character candidate storage means.

Preferably, the character candidate recognition means evaluates correctness of the character recognition on each of the character candidates specified in the character recognition, the character candidate storage means stores the character string, based on information indicative of the correctness evaluated by the character candidate recognition means, the search means is configured so that when each of the characters forming the keyword matches any of the character strings stored by the character candidate storage means, the search means evaluates reliability on the match from the information indicative of the correctness, and the output means outputs the result of the search, also based on the reliability. This configuration enables the output of the search result according to the reliability of the search, based on the correctness of the recognition of each of the characters forming the character string in the image. Namely, the device is able to provide the output of the search result more convenient to users.

Preferably, the search means determines a number of character candidates to be judged on the match with the keyword, according to a number of the characters of the keyword, and determines a character string to be judged on the match with the keyword, from the information indicative of the correctness on the character candidates. This configuration enables more appropriate execution of the image search, according to the number of characters of the search keyword.

Preferably, the search means calculates a score value of an image including the character candidates for the keyword, from the result of the search on the match between the keyword and the character string, and the output means outputs the result of the search by the search means according to the score value. This configuration enables execution of the output of the search result more convenient to users.

Preferably, the search means calculates the score value for a plurality of keywords input by the keyword input means. This configuration allows execution of the search for the plurality of search keywords and execution of the search more convenient to users.

Preferably, the search means calculates the score value, based on a ratio of a number of images including the keyword, to a number of images stored in the image database. This configuration enables the output of the search result according to an appearance rate of the keyword in the images. Namely, the device is able to provide the output of the search result more convenient to users.

Preferably, the information processing device further comprises: visual saliency calculation means for calculating a visual saliency of the character string based on at least any of a size, a color, a shape, and a decoration of each character, and a contrast between a character color and a background color, from an image of the character string region extracted by the character string region extraction means, and the search means calculates a score value of the image including the character string, from the visual saliency of the character string region for which character candidates for the character string matching each of the characters of the keyword in the sequence of the keyword have been recognized. According to this configuration, the device outputs the search result according to the visual saliency of the character string based on at least any of the size, color, shape, and decoration of the characters forming the character string in the image, and the contrast between character color and background color. Therefore, for example, in a situation where the search keyword is characteristically used in an image, the device is able to output the search result with the image at a high rank. Namely, this configuration can facilitate the detection in the case where the search keyword is characteristically used in an image.

Preferably, the image database stores images as search targets so as not to include any identical images and stores hash values obtained from the images and information indicative of places of web pages using the images, in correspondence with each other, and the output means outputs information indicative of images obtained by the search by the search means and including no identical images, and information indicative of places of web pages using the images stored in correspondence with the hash values of the images in the image database. In this configuration, the hash values of the images as search targets are stored in correspondence with the information indicative of places of web pages using the images, and the search result to be output is the information indicative of the images obtained by the search, and the information indicative of the places of web pages using the images stored in correspondence with the hash values of the images. Since identical images have hash values falling within a certain range, the images used at places of multiple web pages can be handled as one image. Therefore, this configuration enables effective utilization of the search result even in the case where the same image is used at places of multiple web pages. Namely, it is feasible to prevent identical images from being arranged as the search result and to efficiently find images for users to desire. For example, it is feasible to prevent identical images with a search keyword entered by a user, from being arranged as the search result.

Incidentally, the present invention can be described as the invention of the information processing device as described above, and can also be described as an information processing method and a computer-readable recording medium that has recorded an information processing program, as described below. They are different in category only but substantially the same invention, with the same action and effects.

Specifically, an information processing method according to the present invention is an information processing method by an information processing device comprising an image database for storing an image as a search target, the method comprising: a character string region extraction step of extracting a character string region including a character string in the image stored in the image database; a character candidate recognition step of specifying a plurality of character candidates through execution of character recognition from the image, for each of characters forming the character string in the character string region extracted in the character string region extraction step; and a character candidate storage step of storing the plurality of character candidates specified by the character candidate recognition step, in the sequence of the character string in correspondence with the image as the specifying origin of the character candidates.

A recording medium according to the present invention is a computer-readable recording medium that has recorded an information processing program to make at least one computer function as: an image database for storing an image as a search target; character string region extraction means for extracting a character string region including a character string in the image stored in the image database; character candidate recognition means for specifying a plurality of character candidates through execution of character recognition from the image, for each of characters forming the character string in the character string region extracted by the character string region extraction means; and character candidate storage means for storing the plurality of character candidates specified by the character candidate recognition means, in the sequence of the character string in correspondence with the image as the specifying origin of the character candidates.

Advantageous Effects of Invention

In the present invention, a keyword can be determined to be included in a character string in an image if characters of the search keyword match a plurality of character candidates. For this reason, the present invention enables appropriate execution of the search even in the case where it is difficult to uniquely recognize each of the characters forming the character string in the image because the image as the search target is, for example, an image including the complicated layout structure, decorated characters, or the like.

BRIEF DESCRIPTION OF DRAWINGS

FIG. 2 is a table showing an example of character candidates recognized from an image and stored by the image search device.

FIG. 4 is a table for obtaining a visual saliency of a character string from a character size of the character string, and a difference between lightness of character color and lightness of background color.

FIG. 11 is a table showing comparison (in the case of N=30) between visual check results and search results.

FIG. 13 is a table showing calculation results of image scores.

FIG. 16 is a table showing an example of character strings consisting of combinations of character candidates recognized from an image, which are stored by the image search device.

DESCRIPTION OF EMBODIMENTS

The preferred embodiments of the information processing device, information processing method, information processing program, recording medium that has recorded the information processing program, and information generating device for image search according to the present invention will be described below in detail with the drawings. In the description of drawings the same elements will be denoted by the same reference signs, without redundant description.

Figure 1:
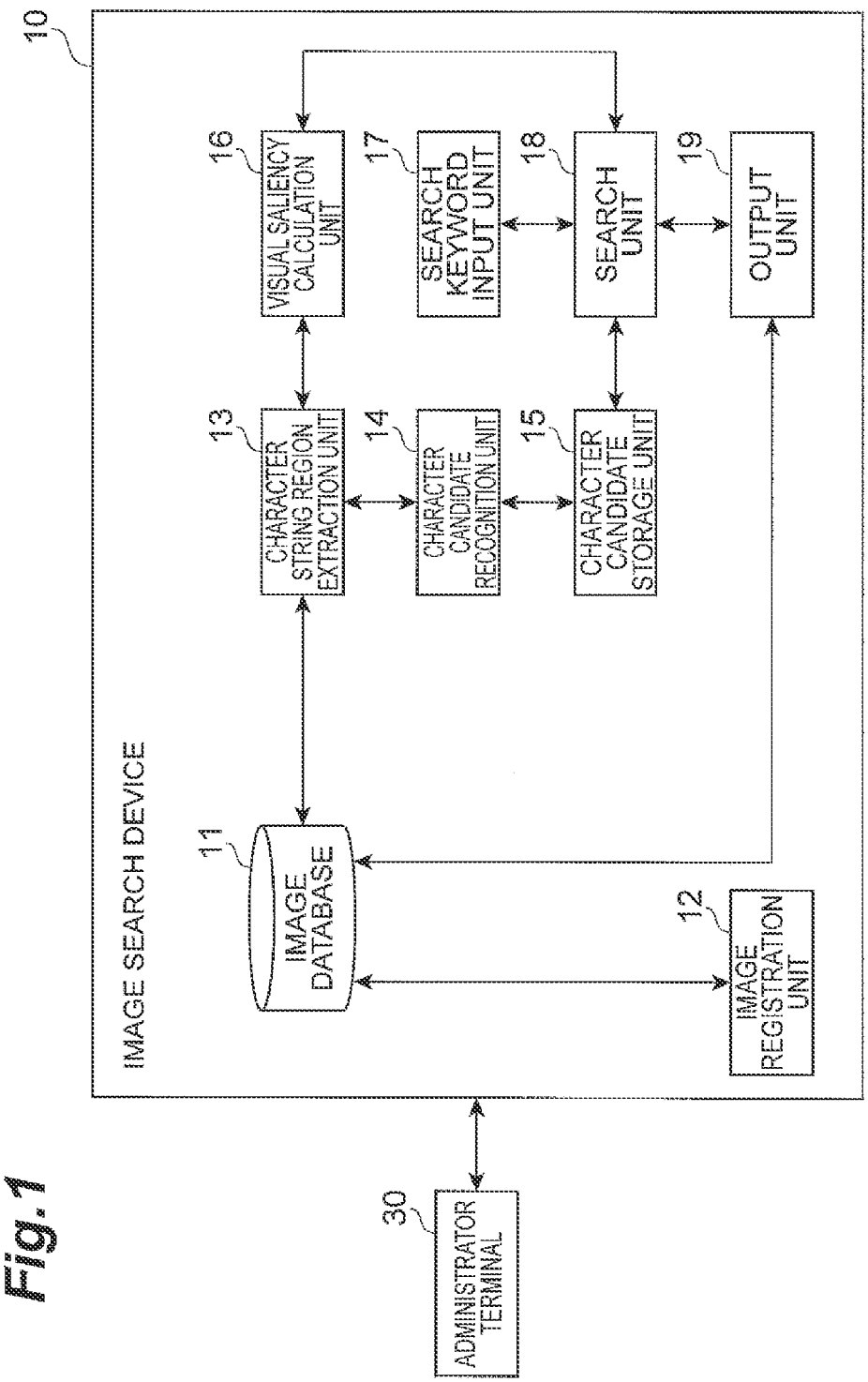
FIG. 1 is a thawing showing a functional configuration of an image search device being an information processing device according to an embodiment of the present invention.

FIG. 1 shows an image search device 10 which is an information processing device according to the present embodiment. The image search device 10 is a device that accepts a search request for an image as a search target and outputs the result of the search according to the search request. In the present embodiment the search target image is a description image of a product sold on a cybermall. The purpose of the image search by the image search device 10 is to check whether there is an inappropriate image as a description image of a product. An inappropriate image as a description image of a product is, for example, one to bring about excessive consumer expectations for advantageous effects of the product such as a health product or a cosmetic product. From the search target and the purpose as described above, the image search device 10 is used, for example, by a company managing the cybermall. Therefore, the image search device 10 is configured to be able to acquire the search target image, for example, by access to a server constituting the cybermall though not clearly shown in FIG. 1.

The image search device 10 is connected to an administrator terminal 30 so as to be able to transmit and receive information to and from the administrator terminal 30. The image search device 10 receives a search request for a search target image from the administrator terminal 30 and outputs information indicative of the search result according to the search request to the administrator terminal 30.

The image search device 10 is realized by a computer such as a server device with hardware including a CPU (Central Processing Unit), memories, a communication module, and so on. These constituent elements operate based on programs or the like to exercise the below-described functions of the image search device 10. The image search device 10 may be composed of a computer system consisting of a plurality of computers.

The administrator terminal 30 is a terminal with a communication function used by users of the company managing the aforementioned cybermall, and is configured to be able to transmit and receive information to and from the image search device 10. The administrator terminal 30 corresponds, specifically, to a communication device such as a PC (Personal Computer).

The following will describe a functional configuration of the image search device 10. As shown in FIG. 1, the image search device 10 is constructed with an image database 11, an image registration unit 12, a character string region extraction unit 13, a character candidate recognition unit 14, a character candidate storage unit 15, a visual saliency calculation unit 16, a search keyword input unit 17, a search unit 18, and an output unit 19.

The image database 11 is a database that stores (or memorizes) images as search targets. The images stored in the image database 11 are description images of products sold on the cybermall, which are posted on websites constituting the cybermall as described above. Each image is provided with information such as an ID to specify the image, so as to allow identification of the image. The image database 11 is configured so as to avoid redundant storage of identical images. Namely, the image database 11 stores the images so as not to include any identical images. The image database 11 is realized, specifically, by hardware such as a memory or a hard disk equipped in the image search device 10. The image database 11 may be one that manages the stored image data by software constituting the database, or one that simply stores the image data on the memory, the hard disk, or the like.

The image database 11 stores, in correspondence with an image to be stored, a hash value obtained by applying a hash function to the image. The hash function is a specific hash function that is prescribed in advance. Identical images have hash values obtained therefrom, falling within a certain range. This allows the device to manage identical images by one hash value even if the identical images are used on a plurality of websites in the cybermall. In this respect, images looking identical for users, e.g., images with similar character colors (e.g., red and orange) or images with similar character sizes may be assumed to be identical images. The aforementioned certain range of hash values can be optionally set according to images assumed to be identical images. In correspondence with the foregoing hash value, the image database 11 stores information indicative of each website as a place of a web page making use of the image. Information indicative of a website is, for example, a URL (Uniform Resource Locator). The image database 11 stores a numerical value corresponding to each piece of the information indicative of the website. This numerical value is, for example, a sales price of a product associated with the image on the website. Each piece of the information indicative of the website may be associated in correspondence with other information such as a description of the product on the website. Based on the data configuration as described above, the image database 11 can store each image in correspondence with information of a website using the image and a sales price of a product associated with the image on the website.

The image registration unit 12 is an image registration means that receives input of an image to be newly registered on the image database 11 and information indicative of a website using the image, and that makes the image database store these pieces of information. The image registration unit 12 preliminarily stores the aforementioned specific hash function. The image registration unit 12 applies the hash function to the input image to calculate a hash value thereof. The image registration unit 12 reads out the hash value stored in the image database 11 and determines whether the calculated hash value is a value falling within the certain range from the hash value already stored in the image database 11. When the image registration unit 12 determines that the calculated hash value is a value within the certain range from the already-stored hash value, the image registration unit 12 makes the image database 11 store the information indicative of the website using the image in correspondence with the already-stored hash value. When the image registration unit 12 determines that the calculated hash value is not a value within the certain range from the already-stored hash value, it makes the image database 11 newly store the input image and the information indicative of the website, and the calculated hash value in correspondence with each other. On that occasion, the device may be configured to also register, for example, the information of a sales price of a product associated with the image on the website as described above.

The input of the image and the information indicative of the website using the image into the image registration unit 12 is carried out, for example, from the administrator terminal 30 based on an operation of a user of the company managing the cybermall. Alternatively, the system may be configured to automatically carry out the input when a new image is used on a website of the cybermall.

The character string region extraction unit 13 is a character string region extraction means that extracts a character string region including a character string in an image stored in the image database 11. The extraction of the character string region is carried out, for example, as described below. First, a target image is converted into a grayscale image in order to extract characters in the image, a threshold is then determined by the discriminant analysis method, and the image is converted into a binary image. This method to be used herein can be, for example, the method described in Otsu: "An Automatic Threshold Selection Method Based on Discriminant and Least Squares Criteria," Transactions D of IECE (the Institute of Electronics and Communication Engineers of Japan), Vol. 63, No. 4, pp. 349-356 (1980-04). Then a labeling process is carried out with the binary image so as to connect obtained image connection elements, using the pitch, aspect ratio, and angle, to form a region and to extract a laterally or vertically arranged character string image. This method to be used herein can be, for example, the method described in Ashida, Nagai, Okamoto, Miyao, and Yamamoto: "Extraction of Characters from Scene Images," Transactions D of IECE, Vol. J88-D2, No. 9, pp. 1817-1824 (2005).

The character string region extraction unit 13 outputs the character string region (data of an image thereof) extracted as described above, to the character candidate recognition unit 14 and the visual saliency calculation unit 16. On this occasion, the unit 13 operates to allow a judgment on from which image the extracted character string region was extracted (or on the image of extraction origin). The character string region extraction unit 13 may extract a plurality of character string regions from one image. In this case, each character string region extracted from the image is provided, for example, with an ID or the like so as to allow the judgment. The character string regions to be extracted may be those having an overlapping region in the image. A portion in the image may be one belonging to both a vertical character string region and a lateral character string region. This is for preventing an extraction omission of a character string even in cases where it cannot be definitely determined that a character string should be read in either direction.

The timing when the character string region extraction unit 13 extracts the character string is, for example, the timing when a new image is stored in the image database 11. Alternatively, the extraction may be carried out based on a trigger of a user's operation.

The character candidate recognition unit 14 is a character candidate recognition means that specifies a plurality of character candidates through execution of character recognition from an image, for each of characters forming a character string in an input character string region extracted by the character string region extraction unit 13. Furthermore, the character candidate recognition unit 14 evaluates correctness of the character recognition on each of the character candidates specified in the character recognition and ranks each of the character candidates. The character recognition is carried out as described below.

Using the morphological analysis, an input image of a character string region is divided into images of respective characters forming a character string and a character recognition process is carried out for each of the character images. The character recognition is carried out in such a manner that a feature amount to be used in the character recognition is extracted from the image and the feature amount is compared with the feature amounts of characters which can be character candidates preliminarily extracted. The feature amount used in the character recognition herein can be, for example, a directional element feature making use of a contour of a character. This method to be used can be, for example, the method described in Son, Tawara, Aso, and Kimura: "High-precision character recognition using directional element feature," Transactions of IECE, vol. J74-D-11, No. 3, pp. 330-339 (1991).

The correctness of character recognition to be used can be, for example, shortness of Euclidean distance of feature amounts. Namely, a character with a feature amount closer in Euclidean distance thereof to a feature amount extracted from an image is determined to be a character candidate with higher correctness. Using this correctness of character recognition, the character candidates are ranked for each of the target character images. The character candidates thus ranked are retained as character candidates multiplied to the Nth rank (where N is a prescribed natural number of 2 or more). A plurality of character candidates are retained for each of the characters forming the character string as described above, thereby to avoid a search omission due to a character candidate error. The character candidate recognition unit 14 outputs to the character candidate storage unit 15, the information of the plurality of character candidates for each of the characters forming the character string specified from the character string region as described above.

The character candidate storage unit 15 is a character candidate storage means that stores the plurality of character candidates specified by the character candidate recognition unit 14, in the sequence of the character string in correspondence with the image as the specifying origin of the character candidates. The character candidate storage unit 15 stores information indicative of each of the character candidates as an index for the image, character by character, in a decreasing order of the correctness evaluated by the character candidate recognition unit 14. This storage is carried out, for example, by storing data (file) indicative of each of the character candidates as described below, for example, on the memory, the hard disk, or the like in the image search device 10.

FIG. 2 shows an example of the information stored in the character candidate storage unit 15. The example shown in FIG. 2 is character candidates recognized from one character string region. As shown in FIG. 2, the information stored by the character candidate storage unit 15 is information of correspondence among an order of each character ("No. j" in FIG. 2), character coordinates, and recognition result. The order of each character is information indicating that the character candidates for the character correspond to what number character forming the character string. The character coordinates are information indicating where the character candidates are located in the image as the specifying origin of the character candidates. The information of character coordinates indicates (x coordinate, y coordinate, width, height) of each character image in a coordinate system where the origin (0,0) is set at the upper left of the image. Here the x coordinate and y coordinate represent a prescribed reference position (e.g., a position of a pixel at the upper left of each character image) in the character image. The information of character coordinates is acquired, for example, by the character candidate recognition unit 14.

The recognition result is rows of character candidates for each of the characters arranged in the decreasing order of correctness. Let us define herein an expression of C[n][j] as a candidate for the jth character and at the nth place in the recognition result C. For example, C[1][1], C[1][2], and C[10][1] in the recognition result C shown in the table of FIG. 2 represent "そ," "予," and "髙," respectively.

The character candidate storage unit 15 stores the information indicative of the recognition result as shown in FIG. 2, in correspondence with the information to specify the image, such as the hash value of the image as the specifying origin of the character candidates, so as to allow a judgment to be made on from which image the information was extracted. If a plurality of character string regions are extracted from one image, the information is stored in correspondence with an ID of each character string region or the like, so as to allow a judgment to be made on from which character string region the information was extracted.

The character candidate storage unit 15 may be configured to store the plurality of character candidates specified by the character candidate recognition unit 14, in the form of character strings consisting of combinations of some of the character candidates, in correspondence with the image as the specifying origin of the character candidates. Namely, it may store character strings each obtained by selecting one of the character candidates for each character as shown in FIG. 2 and combining selected candidates in the sequence of the character string.

For example, when the recognition result is the one as shown in FIG. 2, the character strings are as shown in FIG. 16. Here, a character string stored as a combination is not a sequence of character candidates in the order thereof acquired from the image, but may be one without a partial character string or partial character strings. For example, let us suppose that the character candidates acquired from the image are "安全 性" and "の高さ"; they do not appear in succession in the order of the character candidates, but they may be arranged in such a combination. Even in the case where the character candidates are stored for each of the characters, a match does not always have to be determined in the order of the character candidates in the below-described search as in the above case. In the case where the character strings are stored as described above, the information associated with the character candidates (information of correctness of character recognition or the like) can also be handled in the same manner as in the case where the character candidates are stored for each of the characters, provided that the information is stored in correspondence with the character strings.

The character strings to be stored herein may be all combinations of character candidates or only a combination or combinations matching a character string assumed to be a prescribed search keyword. A part of the character string (e.g., the part "その安 全性" in the example of the information in FIG. 2) may be stored.

The visual saliency calculation unit 16 is a visual saliency calculation means that calculates and stores, from the image of the character string region extracted by the character string region extraction unit 13, a visual feature amount (saliency) of the character string based on at least either of the size and color of characters forming the character string. The visual saliency calculation unit 16 calculates the visual saliency, based on a difference between a lightness of pixels determined to form the character string of the character string region and a lightness of pixels determined to form the background of the character string region. The visual saliency calculation unit 16 determines that the lightness of the pixels determined to form the character string of the character string region is a lightness of pixels with a majority color among the pixels, and determines that the lightness of the pixels determined to form the background of the character string region is a lightness of pixels with a majority color among the pixels. More specifically, the visual saliency calculation unit 16 calculates the visual saliency of the character string by processing as described below. The visual saliency calculation unit 16 stores the calculated visual saliency in correspondence with the character string. This storage is carried out, for example, by storing the information on the memory, hard disk, or the like in the image search device 10.

The visual saliency calculation unit 16 may also be configured to calculate and store the visual saliency of each of the characters forming the character string. In this configuration, the visual saliency of the character string can be obtained by summing up the visual saliencies of the respective characters in the search.

The visual saliency calculation unit 16 performs the character recognition in the same manner as the character candidate recognition unit 14. However, the character recognition by the visual saliency calculation unit 16 does not always have to be one to specify a plurality of character candidates. The visual saliency calculation unit 16 specifies the size of characters (character size) from vertical and lateral sizes of a character image region obtained in extraction of characters. The character size is obtained, for example, in point (pt) unit.

The visual saliency calculation unit 16 acquires the character color and background color from a character region and a background region in the character image region, by the representation color selection method. The representation color selection method is described, for example, in Hase, Yoneda, Sakai, and Maruyama: "Consideration of Color Segmentation to Extract Character Areas from Color Document Images," Transactions D-II of IECE, vol. J83-D-II, No. 5, pp. 1294-1304 (2000). The procedure of selection of representation colors is as follows. First, pixel values in each area of the character region and the background region are converted from the RGB color space to the L*a*b* color space. Thereafter, all the pixels are mapped to the L*a*b* color space divided into cubes with each side of w, and the number of pixels falling in each small area is checked. Here w is a prescribed value. As a result, a representation color is selected as a color of a small area the number of pixels of which is the largest among the numbers of pixels falling in respective 26 surrounding areas. If there are two or more such areas, any one of those areas is selected as a representation color.

Figure 3:
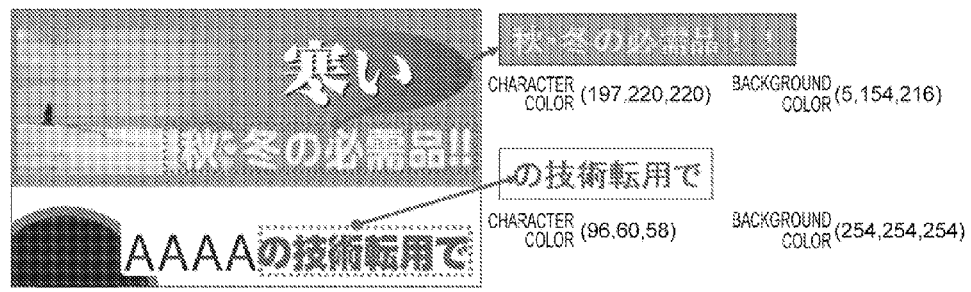
FIG. 3 is a drawing showing an example of acquisition of character colors and background colors from character string regions in an image.

FIG. 3 shows an example in which the representation color selection was actually carried out to acquire character colors and background colors. In FIG. 3, regions indicated by dashed lines represent character string regions. The value of w in the representation color selection was determined to be 4. The visual saliency calculation unit 16 determines the lightness L from RGB values of pixels of the representation color according to formula (1) below.

$$L=0.298912R+0.586611G+0.114478B \qquad (1)$$

The visual saliency calculation unit 16 calculates the absolute value of the difference between the lightness L of the character color and the lightness L of the background color. Subsequently, the visual saliency calculation unit 16 calculates the visual saliency of the character string from the character size and the lightness difference thus obtained, according to the table of FIG. 4. In the table shown in FIG. 4, the visual saliencies are defined by qualitative notations, low, medium, and high, but they may be converted to quantitative values. The visual saliency calculation unit 16 outputs information indicative of the calculated visual saliency of the character string to the search unit 18.

The timing when the visual saliency calculation unit 16 calculates the visual saliency is, for example, the timing when a new image is stored in the image database 11, as in the case of the timing when the character string region extraction unit 13 extracts the character string. In this case, the visual saliency is stored, for example, as information added to an index being the index for the image. Alternatively, it may be carried out in accordance with a command from the search unit 18, in execution of the search process by the search unit 18. The visual saliency calculation unit 16 may also be configured to calculate the visual saliency, based on character features other than the size and color, e.g., based on at least any of the shape (font) and decoration, and the contrast between the character color and the background color.

The search keyword input unit 17 is a search keyword input means for inputting a keyword for a search. The search keyword input unit 17 may input two or more keywords. In that case, it is preferable to also input information indicating whether the search should be an AND search or an OR search with the plurality of keywords. The input of the search keyword is carried out, for example, as described below.

The search keyword input unit 17, when accepting an access request from the administrator terminal 30, transmits data of a web page having a form of keyword input, to the administrator terminal 30. The administrator terminal 30 receives the web page data and displays it. In the administrator terminal 30, an input operation of a keyword is performed by a user and a search request including the keyword is sent to the image search device 10. The search keyword input unit 17 receives the search request and acquires the keyword from the received search request to implement the input of the keyword. The search keyword input unit 17 outputs the input keyword to the search unit 18.

The search unit 18 is a search means that searches the images stored in the image database 11, using the keyword input from the search keyword input unit 17. The search is performed by determining whether each of characters forming the keyword input from the search keyword input unit 17 matches any one of the character candidates forming the character string stored in the character candidate storage unit 15, in the sequence of the keyword. For example, in a case where the search keyword is "安全性 (an•zen•sei)" and where the plurality of character candidates forming the character string are those shown in the table of FIG. 2, the character string shown in FIG. 2 is determined to hit the keyword of "安全性" because the characters of "安 (an)," "全 (zen)," and "性 (sei)" are included as the third to fifth character candidates. The determination on whether a character string hits a keyword will be described later using a flow.

In the form where the character candidate storage unit 15 stores the character strings consisting of combinations of character candidates in the sequence of the character string, as described above, the search may be carried out by comparing the keyword input from the search keyword input unit 17, with the character strings stored in the character candidate storage unit 15. If the keyword input from the search keyword input unit 17 is included in the character strings stored in the character candidate storage unit 15, the character strings stored in the character candidate storage unit 15 are determined to hit the keyword. When the character candidate storage unit 15 is configured to store the character strings in this manner, the search process can be quickly performed because the search can be carried out by the determination on the match of the search keyword with the character strings as described above. When the character candidates are stored as the information shown in FIG. 2, instead of being stored in the form of the character strings, it becomes feasible to perform the search for unknown words or ambiguous keywords.

The above-described search method, when compared with the search using only the first candidates in the result of the character recognition, holds promise of reduction in search omissions (or improvement in recall) but is considered to cause increase in search errors with many recognition errors at the same time (or decrease in precision). Therefore, when each of the characters forming the keyword matches any one of the plurality of character candidates stored in the character candidate storage unit 15 (or when character candidates hit the keyword), the search unit 18 evaluates reliability on the match (degree of match) from the aforementioned information indicative of correctness. More specifically, the search unit 18 calculates character recognition reliability (similarity) to the keyword t as a value indicative of the aforementioned reliability, from the ranks of character candidates matching the characters of the keyword. The character recognition reliability herein is a value in the range of 0.0 to 1.0 and the larger the value the higher the reliability. The search unit 18 calculates the character recognition reliability, similarity, by formula (2) below.

$$\text{similarity}(t) = \text{Keyword}(t).\text{length}/\text{totalscore}(t) \quad (2)$$

In the above formula, Keyword(t).length represents the length of the keyword t (the number of characters) and totalscore(t) a total of the ranks of the coinciding (matching) character candidates. When a character string of only first candidates matches the keyword, the character recognition reliability thereof is 1.0.

Figure 5:
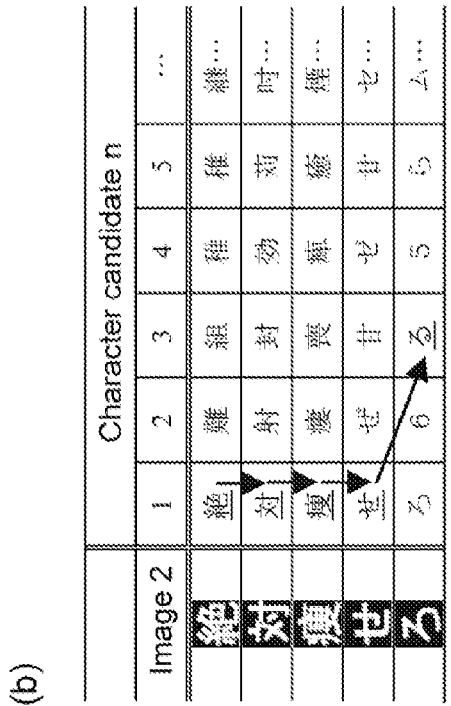
FIG. 5 is a drawing for explaining a relation between search keyword and character recognition reliability.

For example, let us explain examples of character recognition reliability in situations where the search is conducted with the keyword of "絶対痩せる" from the respective character recognition results of two images shown in FIG. 5. In the example shown in FIG. 5 (*a*), all the characters match the first candidates and thus the character recognition reliability is calculated as 5≥(1+1+1+1+1) to be 1.00. In the example shown in FIG. 5 (*b*), the last character matches the third candidate and thus the character recognition reliability is calculated as 5≥(1+1+1+1+3) to be 0.71. In this manner, an image with a low character recognition reliability has a high possibility of erroneous search, whereas an image with a high character recognition reliability has a high possibility of accurate inclusion of the search keyword. Namely, the character recognition reliability can be used as an index for more accurate inclusion of the search keyword. For this reason, when images including the search keyword are listed from a large number of images, images of results with less search errors can be preferentially presented by sorting the search results on the basis of their character recognition reliabilities.

The search unit 18 may be configured to determine the number of character candidates to be judged on the match with the keyword, according to the number of characters of the keyword. It will be described in more detail later, but when the number of characters of the search keyword is small (or when the search keyword is short), it is recognized that a search error tends to occur, so as to decrease the matching rate. Therefore, for example, when the number of characters of the keyword is determined to be not more than a prescribed threshold, the number of character candidates to be judged on the match may be set to a number smaller than usual. The search unit 18, when determining the number of character candidates, then determines the character candidates to be judged on the match with the keyword, from the information indicative of the correctness of the character candidates. Specifically, the search unit 18 determines the character candidates up to the rank corresponding to the determined number of character candidates, as the character candidates to be judged on the match.

The search unit 18 calculates a score value of an image including the character candidates for the keyword, from the result of the search on the match between the keyword and the character candidates. This score value indicates an order of the image to be output as the search result and in the present embodiment it indicates a level of likelihood that the search keyword is included in an inappropriate form in the image.

First, the search unit 18 calculates by formula (3) below, a character feature amount termscore(t,m) of the mth character string (t,m) included in the image, from the visual feature saliency(t) and the character recognition reliability similarity (t) of the search keyword t obtained as described above.

$$\text{termscore}(t,m) = (1-\alpha) \cdot \text{similarity}(t,m) + \alpha \cdot \text{saliency}(t,m) \quad (3)$$

In this formula, α represents a value indicative of a weight on the visual saliency and the character recognition reliability. The factor α is a prescribed value ranging from 0 to 1. There is a correlation among α, similarity, and saliency and the search result with higher accuracy can be obtained thereby. It is desirable to determine how to set α, i.e., how the weight is to be placed on similarity and saliency, depending upon the way of use and the purpose of the search. When α=0 is adopted, scores are obtained reflecting only the character recognition reliability (similarity), without consideration to the visual feature (saliency). On the other hand, when α=1 is adopted, scores are obtained reflecting only the visual feature (saliency), without consideration to the character recognition reliability (similarity). As α becomes closer to 1, the result becomes worse in terms of coincidence between characters. Furthermore, the mth character string in the image indicates what number character string is among the character strings associated with the plurality of character string regions extracted by the character string region extraction unit 13. The number m takes any value from 1 to a value corresponding to the number of character string regions extracted by the character string region extraction unit 13.

Namely, the search unit 18 calculates the score value of the image including the character string, based on the visual saliency calculated by the visual saliency calculation unit 16 from the character string region for which the plurality of character candidates forming the character string matching the characters of the keyword in the sequence of the keyword were recognized.

The search unit 18 calculates the score value for each of a plurality of keywords input by the search keyword input unit 17. The search unit 18 calculates tf-idf of the keyword in the image, in order to give consideration to the appearance frequency of the keyword in images. tf-idf is known as an algorithm to extract characteristic words from documents, and is an index used, mainly, in the fields of information search, document summarization, and so on. tf represents an appearance frequency of a word in documents and idf represents an inverse appearance frequency to decrease the degree of importance for a word frequently appearing in documents and to increase the degree of importance for a word appearing in specific documents only. In the present technique, this idea of tf-idf is extended to in-image characters, so as to calculate the image score using it in combination with the visual saliency and the character recognition reliability of the character string.

In order to increase the image score according to the appearance frequency of the search keyword t, the search unit 18 obtains a sum of squares of respective character feature amounts of the search keyword t included tf(t) times in an image according to formula (4) below, and defines it as a score of the image by the search keyword. For correspondence between the character string and the image, reference is made to the information of correspondence between the character candidates and the image stored by the character candidate storage unit 15. In this formula, m is a suffix of each character string including the keyword t in the target image and is an integer in the range of 1 to tf(t).

[Math 1]

$$\text{score}(t, \text{image}) = \sum_{m=1}^{tf(t)} \{termscore(t, m)\}^2 \quad (4)$$

The image score in execution of the search using a plurality of search keywords can be calculated using values of idf(t). idf(t) of search keyword t is determined by formula (5) below, using the total image number (A) of search targets and the number (S) of images including t. idf(t) takes a larger value with decrease in the number of images including the search keyword t, so as to indicate a rare word.

$$idf(t) = \log(A/(S+1)) + 1 \quad (5)$$

The image score in the case of the AND search with a plurality of search keywords is calculated by formula (6) below to determine a total product of values resulting from multiplication of values of idf(t) by image scores score(t, image) of the plurality of the search keywords t in a query (search request) q.

[Math 2]

$$\text{score}(q, \text{image}) = \prod_{t \in q} idf(t) \cdot \text{score}(t, \text{image}) \quad (6)$$

The image score in the case of the OR search with a plurality of search keywords is calculated by formula (7) below to determine a total sum of values resulting from multiplication of values of idf(t) by image scores score(t,image) of the plurality of the search keywords t in a query q.

[Math 3]

$$\text{score}(q, \text{image}) = \sum_{t \in q} idf(t) \cdot \text{score}(t, \text{image}) \quad (7)$$

As described above, the search unit 18 calculates the score value, based on the ratio of the number of images including the keyword, to the number of images stored in the image database 11.

Since in the idea of tf-idf the probability of inclusion of search keyword t increases with increase in length of a document, it is common practice to adjust tf according to a document amount. In the present technique, therefore, it is also desirable to adopt weighting using the length of the character string after character recognition and the size of the image, as an index of the document amount in the image. However, since a product description image as a target in the present embodiment has a complicated background and layout, the recognition result often contains noise, e.g., erroneous recognition to recognize the background as characters during the character recognition. Therefore, it is difficult to categorically use the length of the character string after the character recognition as an index of a character amount in the image. Furthermore, since the image size and a character amount in the image are not constant, there are cases where a supergiant image of 600×10,000 pix (pixels) has a very low score and where a small banner image of about 20×100 pix has a suddenly high score. For this reason, in the present embodiment the weighting by the document amount in the image does not always have to be adopted.

The search unit 18 outputs to the output unit 19 the information indicative of images hitting the keyword by the search and the image scores score(q,image) for those images.

The output unit 19 is an output means that outputs the result of the search by the search unit 18. The output unit 19 outputs the information indicative of the images hitting the keyword. The information indicative of the images output by the output unit 19 is based on the correspondence between the character candidates and the images stored by the character candidate storage unit 15.

Figure 6:
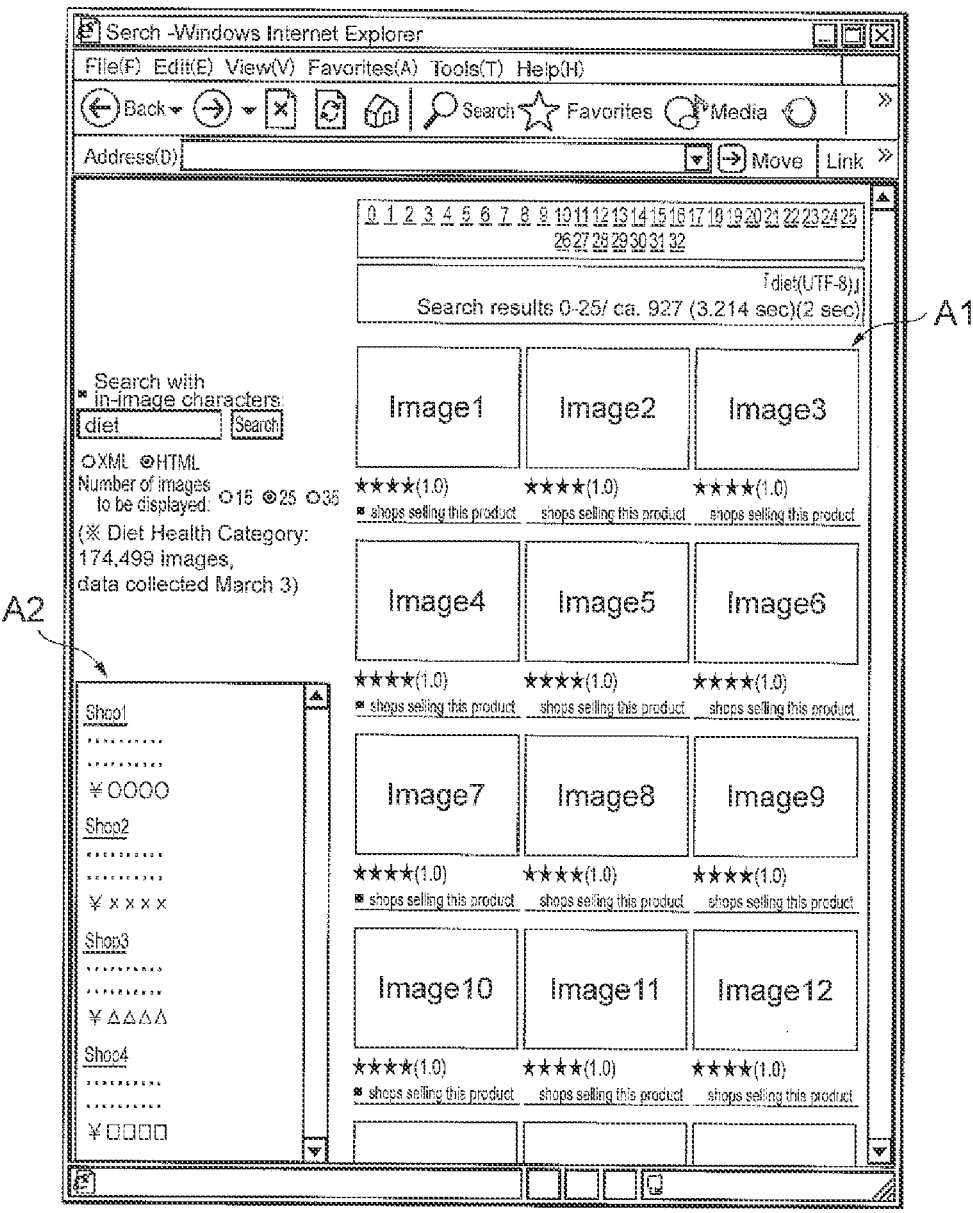
FIG. 6 is an example of a screen output and displayed as the search result from the image search device.

Specifically, for example, the output by the output unit 19 is performed by transmitting information of a web page containing the information of the search result, to the administrator terminal 30. FIG. 6 shows an example of display in which the web page is displayed on a browser of the administrator terminal 30. The images hitting the keyword are displayed as shown in FIG. 6. The displayed images herein are arranged in a decreasing order of the image scores score(q, image). Namely, the output unit 19 outputs the result of the search by the search unit 18, based on reliabilities on the match between the keyword and the character candidates evaluated by the search unit 18. The output unit 19 outputs the result of the search by the search unit 18, according to the score values of the respective images calculated by the search unit 18.

Furthermore, the output unit 19 outputs information based on the information associated with the hash values of the images stored in the image database 11. The output unit 19 outputs information indicative of images obtained by the search by the search means and including no identical images, and information indicative of websites using the images stored in correspondence with the hash values of the images in the image database 11. More specifically, the output unit 19 outputs the information indicative of the images obtained by the search by the search unit 18, accepts an input to select an image according to the output, and then outputs information indicative of a website using the image stored in correspondence with the hash value of the image according to the input.

In the example shown in FIG. 6, first, the output unit 19 transmits to the administrator terminal 30, the data of the web page to display the images hitting the keyword as the result of the search by the search unit 18. In the administrator terminal 30, those images are displayed on the browser. Area A1 in FIG. 6 is a section in which the images hitting the keyword are displayed. Next, in the administrator terminal 30 a user selects any one of the images displayed on the browser by clicking on a part of "Shops selling this product", and then the administrator terminal 30 sends information indicative of the selected image to the image search device 10. The output unit 19 receives the information indicative of the selected image, refers to the image database 11 to acquire information indicative of websites corresponding to the hash value of the image, and outputs the information to the administrator terminal 30.

Furthermore, the output unit 19 refers to the image database 11 to acquire information indicative of sales prices of the product corresponding to the information indicative of the websites. When transmitting the information indicative of the websites to the administrator terminal 30, the output unit 19 outputs the information so that the websites are displayed in an order of the sales prices of the product (e.g., in decreasing order or increasing order of the prices). When the information indicative of the websites is displayed on the administrator terminal 30, the information may be displayed along with the sales prices of the product and descriptions of the product on the websites. Area A2 in FIG. 6 is a section displaying the information indicative of the websites using the image, the sales prices of the product, and so on. As described above, the output unit 19 outputs the information indicative of the websites using the image according to the sales prices stored in the image database 11. The above described the functional configuration of the image search device 10.

Figure 7:
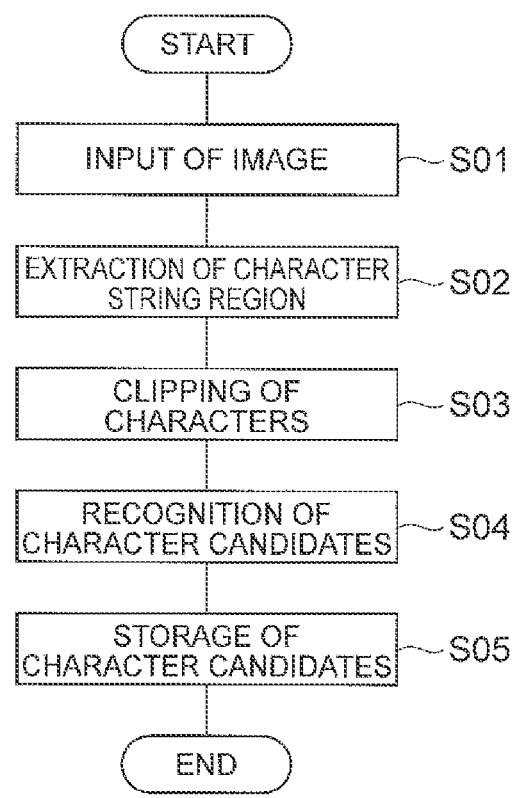
FIG. 7 is a flowchart showing processing up to generation of information for image search, in a procedure (information processing method) executed by the image search device according to the embodiment of the present invention.
Figure 8:
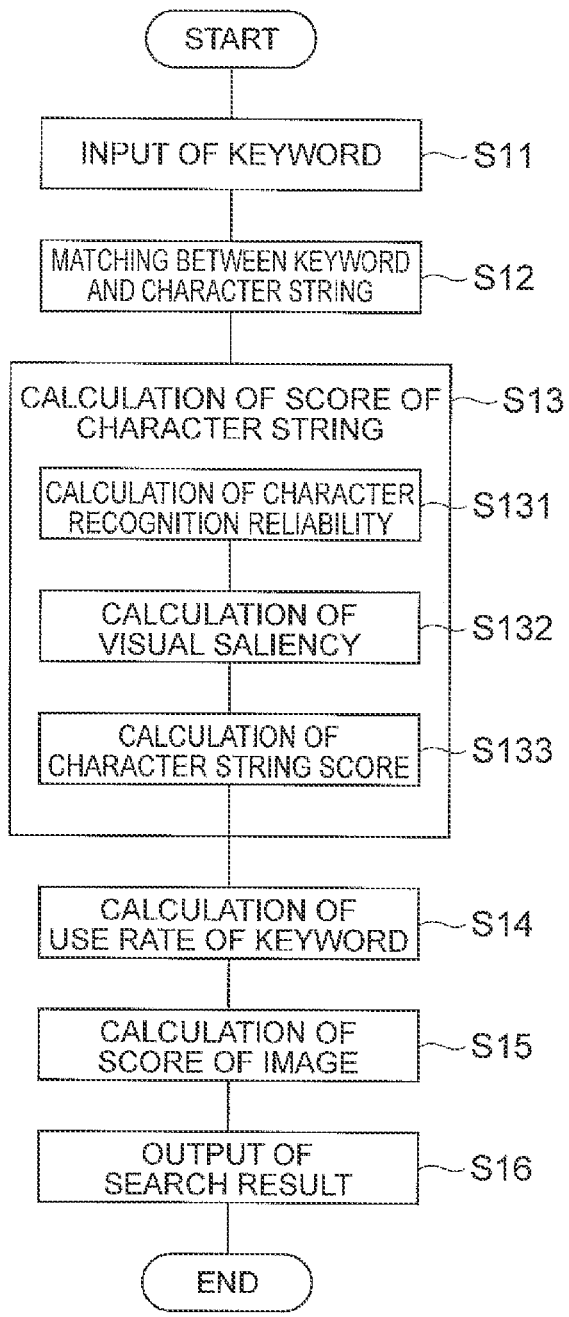
FIG. 8 is a flowchart showing a process of actually performing an image search, in the procedure (information processing method) executed by the image search device according to the embodiment of the present invention.
Figure 9:
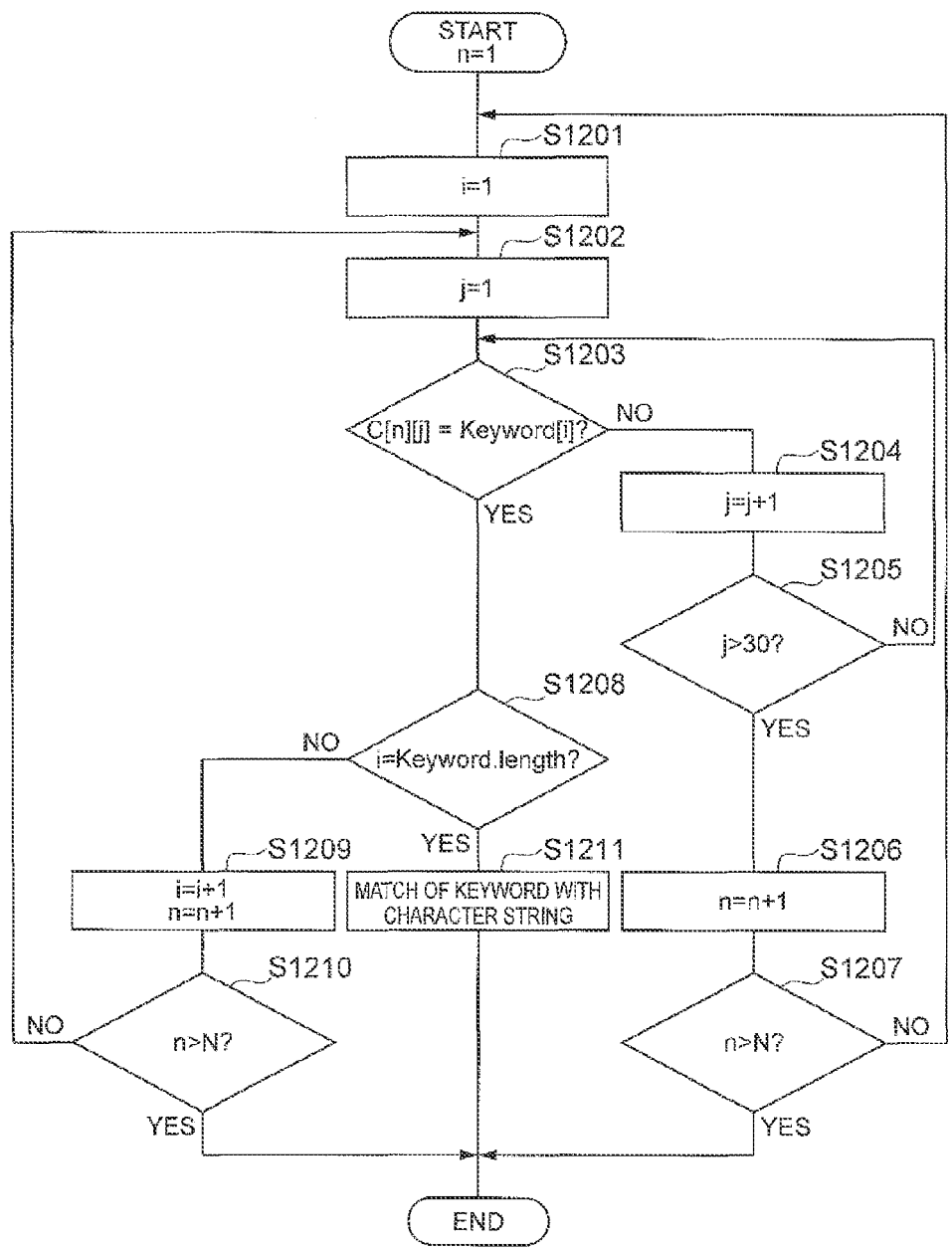
FIG. 9 is a flowchart showing a keyword search process in the procedure (information processing method) executed by the image search device according to the embodiment of the present invention.

The below will describe the processing procedure (information processing method) executed by the image search device 10 of the present embodiment, using the flowcharts of FIGS. 7 to 9. The processing up to generation of information for image search will be first described using the flowchart of FIG. 7, and thereafter the processing of actually performing the image search will be described using the flowcharts of FIGS. 8 and 9.

In the image search device 10 of the present embodiment, a search target image is entered and the image registration unit 12 registers the image in the image database 11 (S01). Also entered with the input of the image is information incidental to the image such as the information indicative of websites using the image and information of sales prices of a product associated with the image, and these pieces of information are stored in correspondence with the hash value in the image search device 10 as described above. The input of the image is carried out, for example, from the administrator terminal 30, based on an operation of a user of the company managing the cybermall. When a plurality of images are entered, the registration is performed for each of the images and the subsequent processing is then carried out.

Next, in the image search device 10, the character string region extraction unit 13 extracts a character string region including a character string in the image stored in the image database 11 (S02, character string region extraction step). The character string image thus extracted is output from the character string region extraction unit 13 to the character candidate recognition unit 14.

Next, the character candidate recognition unit 14 divides the extracted image of the character string region into images of respective characters constituting the character string (S03, character candidate recognition step). Thereafter, the character candidate recognition unit 14 performs the character recognition process on each of the divided images to specify a prescribed number of character candidates for each character (S04, character candidate recognition step). The information indicative of the character candidates specified in this manner is output from the character candidate recognition unit 14 to the character candidate storage unit 15. If a plurality of character string regions are extracted in S02, the above-described processing is carried out for each of the character string regions.

Next, the character candidate storage unit 15 stores the information of character candidates input from the character candidate recognition unit 14 so that the search unit 18 can retrieve the character candidates in a search process (S05, character candidate storage step). The above described the processing up to the generation of the information for image search.

Subsequently, the processing of actually performing the image search will be described using the flowcharts of FIGS. 8 and 9. In the image search device 10 of the present embodiment, the search keyword input unit 17 receives an input of a search keyword (S11, search keyword input step). The input of the search keyword is implemented, for example, by receiving a search request including the keyword, from the administrator terminal 30. The input search keyword is output from the search keyword input unit 17 to the search unit 18.

Next, the search unit 18 determines whether the input search keyword matches any of the character candidates stored in the character candidate storage unit 15, thereby to perform the search with the keyword (S12, search step).

This search with the keyword will be described in more detail using the flowchart of FIG. 9. Let us define Keyword[i] as each of characters of the search keyword. Letter i represents a suffix indicative of an order of a character in the keyword. Keyword[1] represents the first character in the search keyword. The number of characters of the search keyword is represented by Keyword.length. Character candidates for the character string acquired from the image are represented by C[n][j]. Letter n is a suffix indicative of an order of each character in the character string and letter j a suffix indicative of a rank of each character candidate (which are the same as in the description in the table of FIG. 1). Furthermore, letter N indicates the number of characters in the character string. In this case, a match with the keyword is judged up to the thirtieth rank of character candidate.

The present processing starts first with n=1. This is for making the judgment on the match with the keyword, from the character candidates for the first character in the character string. Next, i=1 is set (S1201). This is for judging whether the first character of the keyword matches the character candidates. Thereafter, j=1 is set (S1202). This is for judging whether the character candidate of the first rank matches the keyword.

Next, it is determined whether the condition of C[n][j]=Keyword[i] is satisfied (S1203). When it is determined that the above condition is not satisfied (NO in S1203), j=j+1 is then set (S1204). This is for judging whether the character candidate of the next rank matches the keyword. Next, it is determined whether the condition of j>30 is satisfied (S1205). This is for performing the judgment on the next character if the rank of the character candidate to be judged on the match with the keyword exceeds the set value. When it is determined that the condition in S1205 is not satisfied (NO in S1205), the determination in S1203 is carried out again.

When it is determined that the condition in S1205 is satisfied (YES in S1205), n=n+1 is then set (S1206). This is for judging the match between the character candidates for the next character in the character string and the keyword. Next, it is determined whether the condition of n>N is satisfied (S1207). This step is to determine whether the match has been judged up to the last in the character string.

When it is determined that the condition in S1207 is satisfied (YES in S1207), the search processing is terminated on the assumption that the character candidates for the character string do not match the keyword. When it is determined that the condition in S 1207 is not satisfied (NO in S1207), the flow returns to the process of S1201 to again start the judgment on the match from the first character of the keyword.

When it is determined that the condition in S1203 is satisfied (YES in S1203), it is then determined whether the condition of i=Keyword.length is satisfied (S1208). This step is to determine whether the match has been judged up to the last character of the keyword. When it is determined that the condition in S1208 is not satisfied (NO in S1208), i=i+1 and n=n+1 are then set (S1209). This is for making the judgment on the match between the next character of the keyword and the character candidates for the next character of the character string. Next, it is determined whether the condition of n>N is satisfied (S1210). This step is to determine whether the judgment on the match has been made up to the last in the character string. When it is determined that the condition in S1210 is satisfied (YES in S1210), the search processing is terminated on the assumption that the character candidates for the character string do not match the keyword. When it is determined that the condition in S1210 is not satisfied (NO in S1210), the flow returns to the process of S1202. This is for making the judgment on the match between the next character of the keyword and the character candidate of the first rank for the next character of the character string.

When it is determined that the condition in S1208 is satisfied (YES in S1208), it turns out that all the characters of the keyword match any of the character candidates forming the character string, in the sequence of the keyword, and therefore the keyword search is terminated on the assumption that the keyword matches the character string. In the present procedure the keyword search is terminated at this point, but the search may be further continued to judge whether subsequent character candidates include portions matching the keyword. It is also possible to make the judgment on the match between the keyword and any of character candidates by another method except for the above-described method.

In S12, the aforementioned judgment on the match between the keyword and the character candidates forming the character string is carried out for all of character strings as search targets. When there are a plurality of keywords input in S11, the aforementioned determination is carried out for the plurality of keywords.

Next, referring back to FIG. 8, the score of the character string is calculated for the character string determined to match the keyword (S13, search step). Specifically, the score is calculated as described below. First, the search unit 18 calculates the character recognition reliability for the character string (character candidates) matching the keyword, using the aforementioned formula (2) (S131, search step).

Next, using the aforementioned formula (1), the visual saliency of the image of the character string region associated with the character string matching the keyword is calculated (S132, visual saliency calculation step). The calculation of the visual saliency is performed by the visual saliency calculation unit 16 in response to a command from the search unit 18 to the visual saliency calculation unit 16. The calculation of the visual saliency itself by the visual saliency calculation unit 16 does not always have to be performed at this timing, but it is also possible to adopt a method of preliminarily storing the information, for example, at the same timing as S04 and referring to the stored information at this timing. The information indicative of the calculated visual saliency is output from the visual saliency calculation unit 16 to the search unit 18.

Next, the search unit 18 calculates the character feature amount termscore(t,m) which is the score value of the character string, using the aforementioned formula (3) (S133, search step).

Next, the search unit 18 calculates idf(t) which is a value indicative of a use rate of the keyword, using the aforementioned formula (5) (S14, search step). Then the search unit 18 calculates the image score score(q,image) from the calculated character feature amount termscore(t,m) and idf(t), using the aforementioned formula (4) and either of formula (6) and formula (7) (S15, search step). The search unit 18 outputs to the output unit 19 the information indicative of the image including the character string determined to match the keyword in S 12, and the information indicative of the aforementioned image score.

Thereafter, the output unit 19 outputs the result of the search by the search unit 18 (S16, output step). The output of the result of the search is carried out in such a manner that information of the search result to the search request from the administrator terminal 30 is generated from the information input from the search unit 18 and then is transmitted to the administrator terminal 30. Specifically, the information of the search result to be displayed on the administrator terminal 30 is information indicative of images including the character string determined to match the keyword, in a decreasing order of image scores as described above. Furthermore, as described above, the output unit 19 also transmits to the administrator terminal 30 the information of websites using the images, and others. The user is allowed to refer to the search result displayed on the administrator terminal 30, thereby to recognize the search result. The above described the processing of actually performing the image search in the image search device 10.

In the present embodiment, as described above, each of characters of a character string in an image is recognized as a plurality of character candidates. Namely, the present embodiment provides the multiple recognition results. Then the search is carried out by judging whether each character of a search keyword matches any of the character candidates. In the present embodiment, therefore, it is determined that the keyword is included in the character string in the image, if each of the characters of the search keyword matches the character candidates.

If an image is, for example, one including a complicated layout structure, decorated characters, or the like, characters in the image are likely to cause character recognition errors due to clipping of characters or extraction of characters. In the present embodiment, however, the search can be appropriately carried out, while preventing search omissions, because the search is conducted from the plurality of character candidates for each character even if it is difficult to uniquely recognize each of characters forming the character string in the image because of the image as described above.

Furthermore, it is preferable to rank the character candidates, based on the correctness of character recognition for each character, and perform the search, based on the ranking, as in the present embodiment. This configuration enables the output of the search result according to the reliability of the search, based on the correctness of the recognition. Namely, for example, it becomes feasible to present the search result from the highest possibility of use of the search keyword and to perform the output of the search result more convenient to users. However, the ranking of character candidates does not always have to be carried out, and the plurality of character candidates may be handled at the same rank.

Furthermore, it is preferable to determine the number of character candidates to be judged on the match, according to the number of characters of the search keyword as described above. This configuration allows more appropriate execution of the search for the image, according to the number of characters of the search keyword. However, the number of character candidates does not always have to be determined as described above, but the number of character candidates to be judged on the match may be set to a fixed value preliminarily set (e.g., 30 as in the aforementioned example).

It is also preferable to calculate the score value of the image and output the search result according to the score value as in the present embodiment. This configuration enables execution of the output of the search result more convenient to users.

It is also preferable to calculate the score value from a plurality of keywords as in the present embodiment. This configuration enables execution of the search for a plurality of search keywords, such as the AND search and the OR search as described above, thereby permitting execution of the search more convenient to users.

It is also preferable to calculate the score value according to the appearance rate of the keyword in images as in the present embodiment. This configuration enables execution of the output of the search result more convenient to users.

It is also preferable to calculate the score value, based on the visual saliency as in the present embodiment. For example, when a search keyword is characteristically used in an image, this configuration allows the search result to be output with the image at a higher rank. Namely, this configuration can facilitate detection when a search keyword is characteristically used in an image. For example, when there are images including the same character string, the score value becomes higher in the case of the image described with large characters such as a title than in the case of the image described with small characters. Therefore, it is feasible to find an expression with a high probability of impropriety as well as visual prominence. However, for example, in cases where there is no need for extracting visually characteristic characters, it is not always necessary to calculate the visual saliency and make the score value reflect the visual saliency.

The features of the present invention using the visual saliency were obtained based on the knowledge of the Inventor of the present invention as described below. Even if an image uses a search keyword for detection of an improper image, there are many cases where the keyword is not always an improper expression, depending on a way of use of the keyword.

Then the Inventor of the present invention conducted a preliminary experiment to visually check 674 images which were judged to be improper images in advance by an administrator of a cybermall. As a result, it was found that the images with improper expression had the following features: (1) an improper word is visually prominent in many cases; (2) the appearance frequency of improper word is high; (3) a plurality of improper words are included in an image. Based on the knowledge of these, the score value of the image was calculated from the visual saliency. The knowledge of the appearance frequency and others is also reflected on the features of the present invention described above.

A man often turns the eyes unconsciously to a stimulus with a different attribute among surrounding visual stimuli. Techniques For Accessibility Evaluation And Repair Tools by W3C teach that a combination of colors easy to read is colors with the lightness difference of not less than 125 and the color difference of not less than 500. It is also known in creation of web contents that contents easy to read need to have the contrast based on the lightness difference or the color difference between character color and background color. Furthermore, the research by Maki et al. shows that the lightness difference of colors has a significant relation to ease in reading, from the evaluation results of 1600 samples with 40 ways of change in each of character and background colors.

Then, in order to make scoring reflect the aforementioned knowledge of "an improper word is visually prominent in many cases," a distribution was measured with focus on the sizes and contrasts of improper character strings in 674 sample images including improper expressions and character strings in other images. As a result, it was found that the character sizes of not less than 30 pt tended to be used frequently in titles and headlines and the character sizes of not more than 20 pt tended to be used frequently in descriptions, irrespective of the sizes of the images. It was also found that a keyword to be detected was used in titles and in easily-noticeable coloring with high contrast. The aforementioned characteristics of the visual saliency were configured from these knowledges. However, the lightness difference range was based on the lightness difference of 125 easy to read, which is defined by W3C, and the lightness difference of 158, which is a "generally sufficient boundary" for cataractal people to feel easy to read, obtained by the research by Takamoto et al.

Furthermore, it is preferable to store a hash value obtained from an image, in correspondence with information indicative of websites using the image and provide the output based on the correspondence as in the present embodiment. Since identical images have the hash values falling within a certain range, images used at a plurality of places can be handled as one image. Therefore, this configuration enables effective utilization of the search result even in the case where the same image is used at a plurality of places. Namely, it is feasible to prevent identical images from being arranged as the search result and to efficiently find images for users to desire. For example, it is feasible to prevent identical images with a search keyword entered by a user, from being arranged as the search result. However, for example, in situations where the case as described above is not assumed, it is not always necessary to perform the storage and output of information using the hash value.

In the above-described embodiment, the image search device 10 had both of the processing up to the generation of information for image search and the processing of actually performing the image search using the generated information for image search. However, devices to perform the above respective processing procedures only, may be separately configured as devices according to the present invention. Namely, one of those devices is an information generating device for image search being an information processing device with at least the image database 11, the character string region extraction unit 13, the character candidate recognition unit 14, and the character candidate storage unit 15, out of the aforementioned functions. The other device is an image search device being an information processing device with at least the character candidate storage unit 15, the search keyword input unit 17, the search unit 18, and the output unit 19, out of the aforementioned functions.

The present embodiment was described using the example of the description image of the product sold on the cybermall, as the search target image, but in the present invention the search target image may be any search target image, without having to be limited to the images of the above purpose. For example, the present invention can also be applied to cases where the search is carried out for targets of electronic book data. Furthermore, the purpose of the image search according to the present invention does not always have to be limited to the above purpose, either, but it may be used for any purpose. Even in the case where an improper image is detected, the search may be carried out using criteria other than the aforementioned criteria. For example, for detection of an improper expression expressed by small characters, the search may be conducted using criteria to increase the score with decreasing size of character.

The below will describe an evaluation experiment according to the present invention. The evaluation experiment was conducted as described below. In order to evaluate degrees of change in accuracy of in-image character search, depending upon the number N of character candidates, the in-image character search was conducted using the numbers of character candidates changing at intervals of 5 in the range of 1 to 60 and using 66 search keywords below which tended to be used frequently in images including improper expressions. The search keywords were, specifically for example, white skin, cells, hair growth, suppression of hair growth, pollen allergy, rejuvenation, and anti-aging.

The experiment was carried out as follows: the recognition of in-image characters is performed by the aforementioned technique to obtain the recognition result, using sample images with improper expressions detected by an administrator of a cybermall preliminarily in "pharmaceutical•contact•nursing care categories." In this regard, 3410 characters were used including alphameric characters, symbols, hiragana, katakana, and kanji (JIS level-1 kanji set), as character category and three fonts were used, "HGS Soei Kakupoptai," "HOP Gyoshotai," and "MS Gothic," which are often used in e-mall shops in order to create dictionaries. Comparison was made among the number (S) of images including the search keywords counted by visual inspection using the aforementioned search keywords, the number (T) of correct images obtained with change in the number of character candidates, and the number (E) of images detected erroneously, and average recall (Recall), matching rate (Precision), and F-measure were calculated according to formulae (8), (9), and (10) below.

$$\text{Recall} = T/S \quad (8)$$

$$\text{Precision} = T/(T+E) \quad (9)$$

$$F = (2 \cdot \text{Recall} \cdot \text{Precision}) \quad (10)$$

Figure 10:
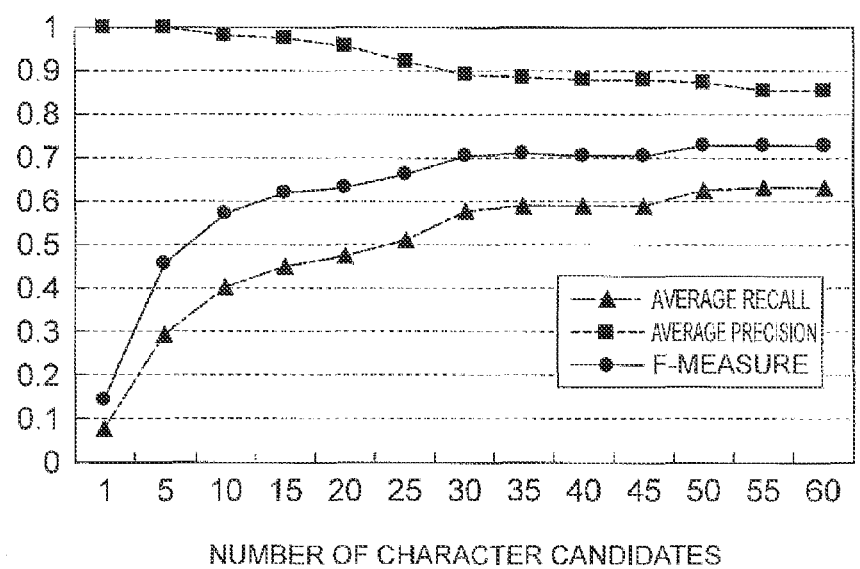
FIG. 10 is a graph showing a relation of the number of character candidates versus accuracy of in-image character search.

FIG. 10 shows a graph showing a relation of the number of character candidates against the above values. As shown in FIG. 10, it is seen that there are tendencies of decrease in precision and increase in recall with increase in the number of character candidates and that search omissions can be reduced by use of multiple character recognition results. The F-measure becomes stable around the number of character candidates of 30 and the difference of search performance becomes smaller over the number of character candidates of 30; therefore, it is seen in the character recognition technique of the present embodiment that the good search result is obtained using the character candidates up to the thirtieth rank.

A relationship of length of search keyword and search accuracy in the case of the number of character candidates being 30 is shown in the table of FIG. 11. As shown in this table, it is recognized that with short search keywords, search errors tend to occur so as to decrease the precision. This is because the probability of detection of erroneously-recognized character recognition result increases by increase in the number of character candidates, and thus the precision can be increased by adjusting the number of character candidates according to the length of the search keyword. Furthermore, there was no correlation found between the recall and the length of search keyword, but it is seen that the recall generally tends to decrease. This is because the sample images included many cases hard to extract and recognize characters, e.g., a character string arranged in an arch form, italic characters, and small-size characters.

Figure 12:
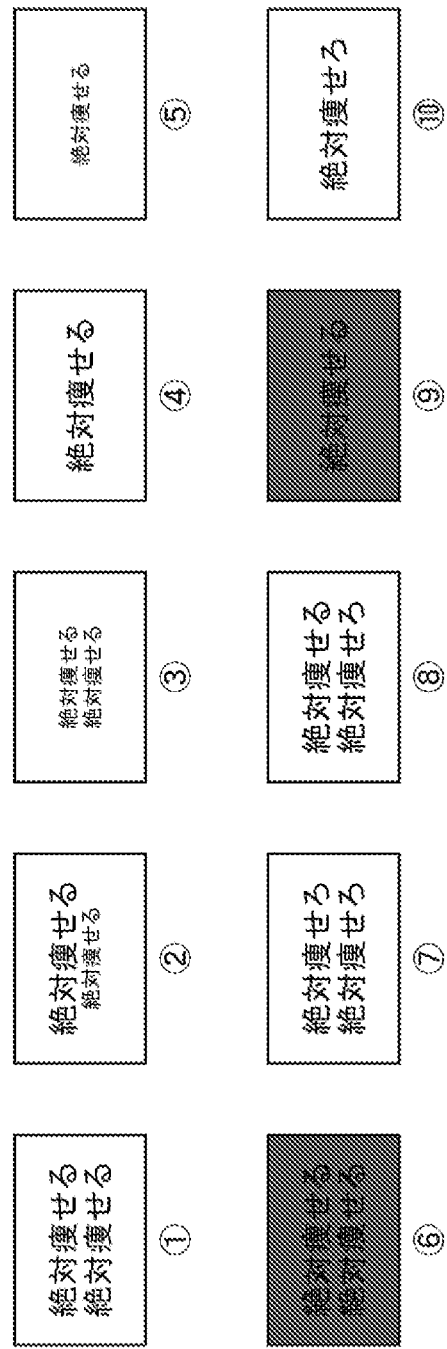
FIG. 12 shows sample images used in an experiment.

Next, the following experiment was conducted in order to check whether an image including a visually-noticeable character string highly likely to be improper could be efficiently found, using the image score through the use of the character recognition reliability, the visual feature of the in-image character string, and the appearance frequency. Ten types of images shown in FIG. 12 were created as sample images and image scores thereof were obtained. The characters in the images used were the font of "MS Gothic" with the color of #000000 (the color representation is the Web Sale Color representation, which is the same hereinafter), the character size for (1), (4), (6) to (10) was 30 pt, the character size for (3) and (5) was 20 pt, the character size for (2) was both of 30 pt and 20 pt, the background color for (1) to (5), (7), (8), and (10) was #FFFFFF, and the background color for (6) and (9) was #666666. The search using the keyword of "絶対痩せる" was conducted with respect to the recognition results of images of the respective character strings of "絶対痩せる" and "絶対痩せる"; the character recognition reliabilities in the two cases were 1.00 and 0.71, respectively, irrespective of the character sizes, as shown above in the description using FIG. 5.

The table of FIG. 13 shows the results of calculation of scores of the sample images with change of parameter α to make a balance between the aforementioned character recognition reliability and visual saliency, at intervals of 0.2 in the range of 0.0 to 1.0. However, as to the aforementioned visual saliency saliency(t), if saliency(t) in formula (3) is set to 0.0, the scores cannot reflect visual features of in-image characters; therefore, the saliency was set to 0.5 for low, 1.0 for high, and 0.75 for medium being an intermediate value between them.

First, when attention is focused on the case of α of 0.0, only the character recognition reliability is reflected on the scores of the images and therefore it becomes feasible to preferentially present images with the result of less search errors. However, the images (1) to (3) and (6) with the same character recognition reliability have the same score and the visuallyunnoticeable image (6) can have a high rank. Since α is the parameter to make a balance between the character recognition reliability and the visual saliency, the visual saliency can be strongly reflected with increase in the value of a. However, when α is 0.6 or more, the scores of (7) and (10) not including the search keyword become each over the scores of (6) and (5) including the same number of search keyword. For this reason, it will lead to display of the result with a search error at a high rank among the search results. Similarly, by comparison among (4), (9), and (10), the images (4) and (9) have the same score with α of 0.0, and the images (4) and (10) have the same score with a of 1.0.

Next, it is seen by comparison among (1), (7), and (8) that the image score becomes higher with increase in the number of search keywords in the image in the case of a except for 1.0. It can be confirmed from these results that the scores of the images not including the search keyword are set to low values by setting the value of a in the range of 0.2 to 0.4 and that the search results can be sorted well according to the visual saliencies.

By giving consideration to the visual saliency and appearance frequency of the character string in addition to the character recognition reliability as described above, the scores can be made higher for images with expressions of large characters like titles than those for images with expressions of small characters if the same character string is included by the same number. This enables efficient finding of images more visually-noticeable and more likely to include improper expressions.

Next, the aforementioned image search device 10 (in-image character search system) was produced and evaluation of search time was conducted using targets of images actually used on a cybermall. The produced system is a web application operating on a web server. Lucene (whole document search engine managed by Apache project) was used in order to realize high-speed search for an arbitrary character string from the aforementioned multiple recognition results. The present system used word division Analyzer (uni-gram) using N-gram implemented on Lucene for indexing, to perform the search for arbitrary word from combinations of character recognition candidates up to the Nth rank. In this regard, however, the calculation of the image score according to the search keyword was carried out while providing Field with the visual saliency obtained from the contrast between character color and background color, and the character size, in indexing. In order to confirm the practicality such as response performance and search accuracy of the developed in-image character search system, the recognition results obtained by in-image character recognition preliminarily carried out were indexed for targets of 567,667 images acquired from "diet•health categories" and "pharmaceutical•contact•nursing care categories" on the actual cybermall.

The measurement was carried out under the conditions below, using a standard PC operating based on a standard OS.

The number of images: 567,667

Index sizes (GB): 2.2 (N=1), 2.8 (N=5), 3.6 (N=10), 4.4 (N=15), 5.2 (N=20), 6.0 (N=25), and 30 (N=6.8)

Figure 14:
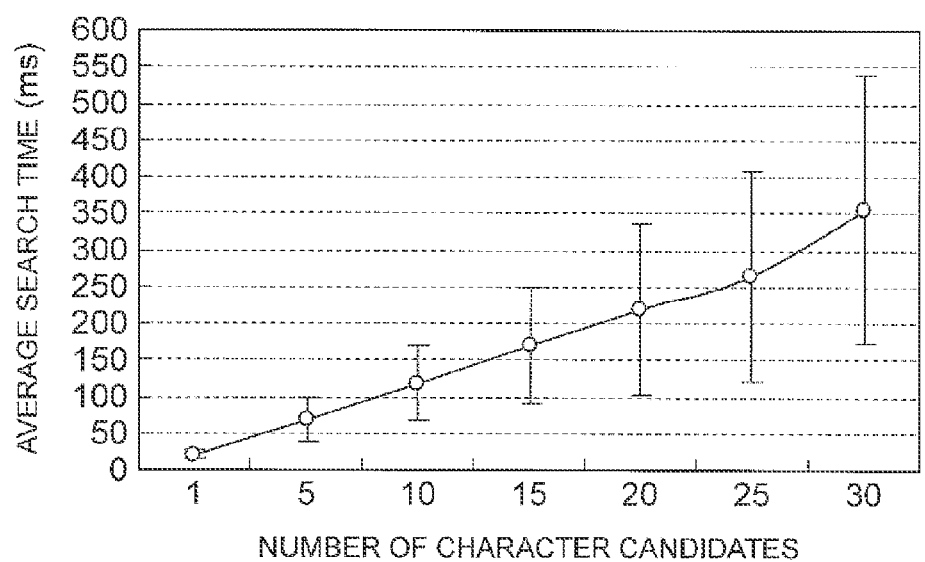
FIG. 14 is a graph showing a relation of the number of character candidates versus search time.

A relation of search time versus number of character candidates was checked using the indexes of 1 to 30 as the number of character candidates with 66 search keywords used in the evaluation on accuracy change of in-image character search according to the number N of character candidates, which was described above. FIG. 14 shows a graph showing the relation of number of character candidates versus search time. As shown in FIG. 14, the search time against the number of character candidates increases at O(n). At the same time, it is understood that the values of standard deviation increase so as to bring about scattering of search time depending upon the length of keyword. An average search time is about 350 milliseconds even in the case of the number of character candidates being 30, and it is thus understood that the system achieved the response performance enough to be used in practice in the sense of stress-free search. In this case, however, the average search time is an average time of ten searches using queries of the aforementioned 66 keywords.

Figure 15:
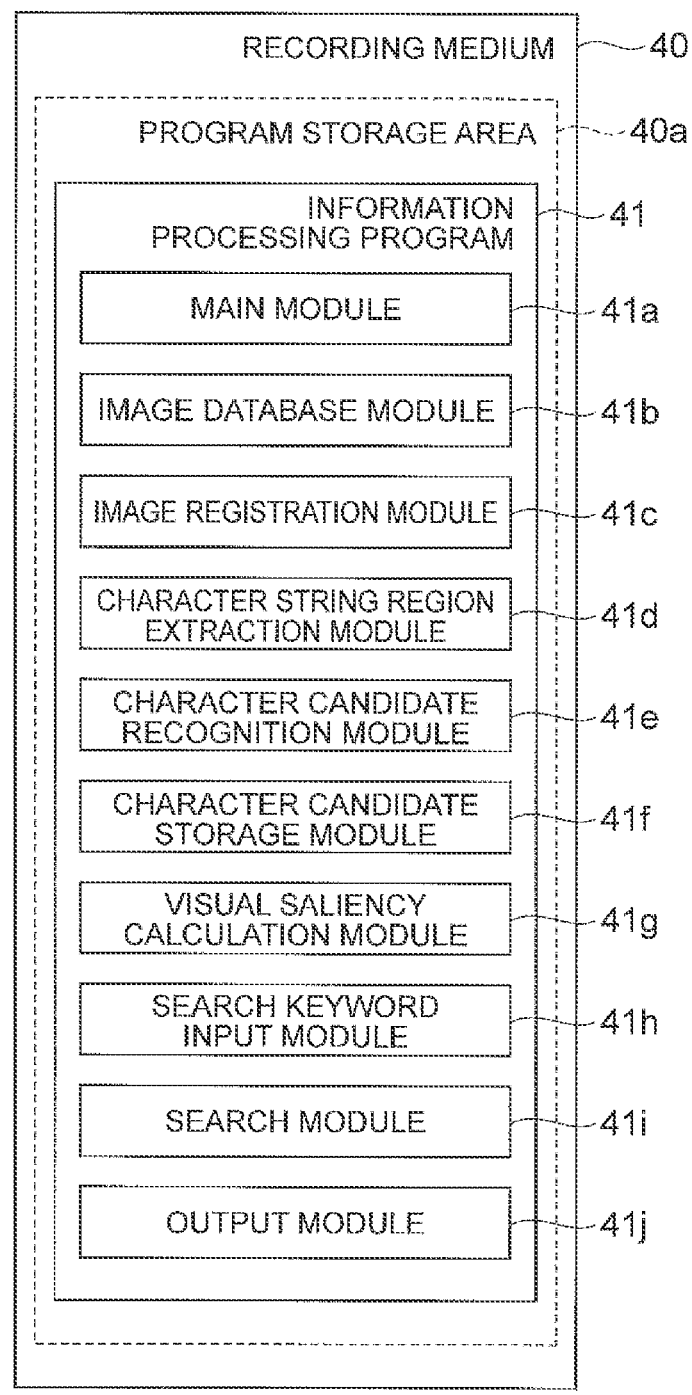
FIG. 15 is a drawing showing a configuration of an information processing program according to an embodiment of the present invention, along with a recording medium.

The below will describe an information processing program for letting a computer execute the aforementioned sequential processing for carrying out the image search by the image search device 10. As shown in FIG. 15, the information processing program 41 is stored in a program storage area 40a formed on a recording medium 40 which is put into a computer and accessed thereby, or which is mounted on the computer.

The information processing program 41 is configured with a main module 41a to generally control the image search processing, an image database module 41b, an image registration module 41c, a character string extraction module 41d, a character candidate recognition module 41e, a character candidate storage module 41f, a visual saliency calculation module 41g, a search keyword input module 41h, a search module 41i, and an output module 41j. Functions substantialized by execution of the image database module 41b, image registration module 41c, character string region extraction module 41d, character candidate recognition module 41e, character candidate storage module 41f, visual saliency calculation module 41g, search keyword input module 41h, search module 41i, and output module 41j are the same as the functions of the image database 11, image registration unit 12, character string region extraction unit 13, character candidate recognition unit 14, character candidate storage unit 15, visual saliency calculation unit 16, search keyword input unit 17, search unit 18, and output unit 19, respectively, in the aforementioned image search device 10.

The information processing program 41 may be configured so that a part or the whole thereof is transmitted through a transmission medium such as a communication circuit, and is received and recorded (including installation) by another device. The modules of the information processing program 41 do not always have to be installed on one computer, but each module may be installed on any of a plurality of computers. In that case, the aforementioned sequential processing of performing the information processing of the information processing program 41 is carried out by a computer system consisting of the plurality of computers.

LIST OF REFERENCE SIGNS 10 image search device; 11 image database; 12 image registration unit; 13 character string region extraction unit; 14 character candidate recognition unit; 15 character candidate storage unit; 16 visual saliency calculation unit; 17 search keyword input unit; 18 search unit; 19 output unit; 30 administrator terminal; 40 recording medium; 40a program storage area; 41 information processing program; 41a main module; 41b image database module; 41c image registration module; 41d character string region extraction module; 41e character candidate recognition module; 41f character candidate storage module; 41g visual saliency calculation module; 41h search keyword input module; 41i search module; 41j output module.

The invention claimed is:

1. An information processing device comprising:
an image database for storing an image as a search target;

character string region extraction means for extracting a character string region including a character string in the image stored in the image database;

character candidate recognition means for specifying a plurality of character candidates through execution of character recognition from the image, for each of characters forming the character string in the character string region extracted by the character string region extraction means, wherein the plurality of character candidates are obtained for each character of the character string;

character candidate storage means for storing the plurality of character candidates specified by the character candidate recognition means, for each of the characters, in correspondence with the image as the specifying origin of the character candidates;

search keyword input means for inputting a search keyword;

search means for performing a search to determine whether each of characters forming the keyword input by the keyword input means matches any of the plurality of character candidates obtained for the each character of the character string stored by the character candidate storage means, in a sequence of the keyword; and output means for outputting a result of the search by the search means, based on the correspondence between the character candidates and the image stored by the character candidate storage means, wherein the character candidate recognition means evaluates correctness of the character recognition on each of the character candidates specified in the character recognition and ranks each of the character candidates obtained for the same character based on the evaluated correctness, wherein the character candidate storage means stores the character candidates, based on information indicative of the correctness evaluated by the character candidate recognition means, wherein the search means is configured so that when each of the characters forming the keyword matches any of the plurality of character candidates stored by the character candidate storage means, the search means evaluates reliability on the match based on a ranking of the matched character candidate, and determines a number of character candidates to be compared with each character of the keyword according to a number of the characters of the keyword, and determines character candidates to be judged on the match with the keyword having the determined number of character candidates, from the information indicative of the correctness on the character candidates, and wherein the output means outputs the result of the search, also based on the reliability.

2. The information processing device according to claim 1, wherein the search means calculates a score value of an image including the character candidates for the keyword, from the result of the search on the match between the keyword and the character candidates, and wherein the output means outputs the result of the search by the search means according to the score value.

3. The information processing device according to claim 2, wherein the search means calculates the score value for a plurality of said keywords input by the keyword input means.

4. The information processing device according to claim 2, wherein the search means calculates the score value, based on a ratio of a number of images including the keyword, to a number of images stored in the image database.

5. The information processing device according to claim 2, further comprising:

visual saliency calculation means for calculating and storing a visual saliency of the character string based on at least any of a size, a color, a shape, and a decoration of each character, and a contrast between a character color and a background color, from an image of the character string region extracted by the character string region extraction means, wherein the search means calculates a score value of the image including the character string, from the visual saliency of the character string region for which character candidates for the character string matching each of the characters of the keyword in the sequence of the keyword have been recognized.

6. The information processing device according to claim 1, wherein the image database stores images as search targets so as not to include any identical images and stores hash values obtained from the images and information indicative of places of web pages using the images, in correspondence with each other, and wherein the output means outputs information indicative of images obtained by the search by the search means and including no identical images, and information indicative of places of web pages using the images stored in correspondence with the hash values of the images in the image database.

7. The information processing device according to claim 1, wherein the search means determines, as the character candidates to be judged on the match with the keyword, character candidates up to a rank corresponding to the determined number of character candidates.

8. An information processing device comprising:

an image database for storing an image as a search target;

character string region extraction means for extracting a character string region including a character string in the image stored in the image database;

character candidate recognition means for specifying a plurality of character candidates through execution of character recognition from the image, for each of characters forming the character string in the character string region extracted by the character string region extraction means, wherein the plurality of character candidates are obtained for each character of the character string;

character candidate storage means for storing a character string consisting of a combination of some of the plurality of character candidates specified by the character candidate recognition means, in correspondence with the image as the specifying origin of the character candidates;

search keyword input means for inputting a search keyword;

search means for performing a search to determine whether each of characters forming the keyword input by the keyword input means matches any of character strings stored by the character candidate storage means, in a sequence of the keyword; and output means for outputting a result of the search by the search means, based on the correspondence between the character string and the image stored by the character candidate storage means, wherein the character candidate recognition means evaluates correctness of the character recognition on each of the character candidates specified in the character recognition and ranks each of the character candidates obtained for the same character based on the evaluated correctness, wherein the character candidate storage means stores the character string, based on information indicative of the correctness evaluated by the character candidate recognition means, wherein the search means is configured so that when each of the characters forming the keyword matches any of the character strings stored by the character candidate storage means, the search means evaluates reliability on the match based on a ranking of the matched character candidate, and determines a number of character candidates to be compared with each character of the keyword according to a number of the characters of the keyword, and determines character string to be judged on the match with the keyword having the determined number of character candidates, from the information indicative of the correctness on the character candidates, and wherein the output means outputs the result of the search, also based on the reliability.

9. The information processing device according to claim 8, wherein the search means calculates a score value of an image including the character candidates for the keyword, from the result of the search on the match between the keyword and the character string, and wherein the output means outputs the result of the search by the search means according to the score value.

10. The information processing device according to claim 9, wherein the search means calculates the score value for a plurality of said keywords input by the keyword input means.

11. The information processing device according to claim 9, wherein the search means calculates the score value, based on a ratio of a number of images including the keyword, to a number of images stored in the image database.

12. The information processing device according to claim 9, further comprising:

visual saliency calculation means for calculating and storing a visual saliency of the character string based on at least any of a size, a color, a shape, and a decoration of each character, and a contrast between a character color and a background color, from an image of the character string region extracted by the character string region extraction means, wherein the search means calculates a score value of the image including the character string, from the visual saliency of the character string region for which character candidates for the character string matching each of the characters of the keyword in the sequence of the keyword have been recognized.

13. The information processing device according to claim 8, wherein the image database stores images as search targets so as not to include any identical images and stores hash values obtained from the images and information indicative of places of web pages using the images, in correspondence with each other, and wherein the output means outputs information indicative of images obtained by the search by the search means and including no identical images, and information indicative of places of web pages using the images stored in correspondence with the hash values of the images in the image database.

14. An information processing method by an information processing device comprising an image database for storing an image as a search target, the method comprising:

a character string region extraction step of extracting a character string region including a character string in the image stored in the image database;

a character candidate recognition step of specifying a plurality of character candidates through execution of character recognition from the image, for each of characters forming the character string in the character string region extracted in the character string region extraction step, wherein the plurality of character candidates are obtained for each character of the character string;

a character candidate storage step of storing the plurality of character candidates specified by the character candidate recognition step, in correspondence with the image as the specifying origin of the character candidates;

a search keyword input step of inputting a search keyword;

a search step of performing a search to determine whether each of characters forming the keyword input in the keyword input step matches any of the plurality of character candidates obtained for the each character of the character string stored in the character candidate storage step, in a sequence of the keyword; and an output step of outputting a result of the search in the search step, based on the correspondence between the character candidates and the image stored in the character candidate storage step, wherein in the character candidate recognition step, correctness of the character recognition on each of the character candidates specified in the character recognition is evaluated and each of the character candidates obtained for the same character is ranked based on the evaluated correctness, wherein in the character candidate storage step, the character candidates, based on information indicative of the correctness evaluated in the character candidate recognition step is stored, wherein in the search step, when each of the characters forming the keyword matches any of the plurality of character candidates stored in the character candidate storage step, reliability on the match is evaluated based on a ranking of the matched character candidate, and a number of character candidates to be compared with each character of the keyword is determined according to a number of the characters of the keyword, and character candidates to be judged on the match with the keyword having the determined number of character candidates are determined, from the information indicative of the correctness on the character candidates, and wherein in the output step, the result of the search is output, also based on the reliability.

15. An information processing method by an information processing device comprising an image database for storing an image as a search target, the method comprising:

a character string region extraction step of extracting a character string region including a character string in the image stored in the image database;

a character candidate recognition step of specifying a plurality of character candidates through execution of character recognition from the image, for each of characters forming the character string in the character string region extracted in the character string region extraction step, wherein the plurality of character candidates are obtained for each character of the character string;

a character candidate storage step of storing a character string consisting of a combination of some of the plurality of character candidates specified by the character candidate recognition step, in correspondence with the image as the specifying origin of the character candidates;

a search keyword input step of inputting a search keyword;

a search step of performing a search to determine whether each of characters forming the keyword input in the keyword input step matches any of character strings stored in the character candidate storage step, in a sequence of the keyword; and an output step of outputting a result of the search in the search step, based on the correspondence between the character string and the image stored in the character candidate storage step, wherein in the character candidate recognition step, correctness of the character recognition on each of the character candidates specified in the character recognition is evaluated and each of the character candidates obtained for the same character is ranked based on the evaluated correctness, wherein in the character candidate storage step, the character string, based on information indicative of the correctness evaluated in the character candidate recognition step is stored, wherein in the search step, when each of the characters forming the keyword matches any of the character strings stored in the character candidate storage step, reliability on the match is evaluated based on a ranking of the matched character candidate, and a number of character candidates to be compared with each character of the keyword is determined according to a number of the characters of the keyword, and character string to be judged on the match with the keyword having the determined number of character candidates is determined, from the information indicative of the correctness on the character candidates, and wherein in output step, the result of the search is output, also based on the reliability.

16. A non-transitory computer-readable recording medium that has recorded an information processing program to make at least one computer function as:

an image database for storing an image as a search target;

character string region extraction means for extracting a character string region including a character string in the image stored in the image database;

character candidate recognition means for specifying a plurality of character candidates through execution of character recognition from the image, for each of characters forming the character string in the character string region extracted by the character string region extraction means, wherein the plurality of character candidates are obtained for each character of the character string;

character candidate storage means for storing the plurality of character candidates specified by the character candidate recognition means, in correspondence with the image as the specifying origin of the character candidates;

search keyword input means for inputting a search keyword;

search means for performing a search to determine whether each of characters forming the keyword input by the keyword input means matches any of the plurality of character candidates obtained for the each character of the character string stored by the character candidate storage means, in a sequence of the keyword; and output means for outputting a result of the search by the search means, based on the correspondence between the character candidates and the image stored by the character candidate storage means, wherein the character candidate recognition means evaluates correctness of the character recognition on each of the character candidates specified in the character recognition and ranks each of the character candidates obtained for the same character based on the evaluated correctness, wherein the character candidate storage means stores the character candidates, based on information indicative of the correctness evaluated by the character candidate recognition means, wherein the search means is configured so that when each of the characters forming the keyword matches any of the plurality of character candidates stored by the character candidate storage means, the search means evaluates reliability on the match based on a ranking of the matched character candidate, and determines a number of character candidates to be compared with each character of the keyword according to a number of the characters of the keyword, and determines character candidates to be judged on the match with the keyword having the determined number of character candidates, from the information indicative of the correctness on the character candidates, and wherein the output means outputs the result of the search, also based on the reliability.

17. A non-transitory computer-readable recording medium that has recorded an information processing program to make at least one computer function as:

an image database for storing an image as a search target;

character string region extraction means for extracting a character string region including a character string in the image stored in the image database;

character candidate recognition means for specifying a plurality of character candidates through execution of character recognition from the image, for each of characters forming the character string in the character string region extracted by the character string region extraction means, wherein the plurality of character candidates are obtained for each character of the character string;

character candidate storage means for storing a character string consisting of a combination of some of the plurality of character candidates specified by the character candidate recognition means, in correspondence with the image as the specifying origin of the character candidates;

search keyword input means for inputting a search keyword;

search means for performing a search to determine whether each of characters forming the keyword input by the keyword input means matches any of character strings stored by the character candidate storage means, in a sequence of the keyword; and output means for outputting a result of the search by the search means, based on the correspondence between the character string and the image stored by the character candidate storage means, wherein the character candidate recognition means evaluates correctness of the character recognition on each of the character candidates specified in the character recognition and ranks each of the character candidates obtained for the same character based on the evaluated correctness, wherein the character candidate storage means stores the character string, based on information indicative of the correctness evaluated by the character candidate recognition means, wherein the search means is configured so that when each of the characters forming the keyword matches any of the character strings stored by the character candidate storage means, the search means evaluates reliability on the match based on a ranking of the matched character candidate, and determines a number of character candidates to be compared with each character of the keyword according to a number of the characters of the keyword, and determines character string to be judged on the match with the keyword having the determined number of character candidates, from the information indicative of the correctness on the character candidates, and wherein the output means outputs the result of the search, also based on the reliability.

18. An information processing device comprising: an image database for storing an image as a search target;

at least one memory operable to store program code;

at least one processor operable to read said program code and operate as instructed by said program code, said program code including:

character string region extraction code that causes the at least one processor to extract a character string region including a character string in the image stored in the image database;

character candidate recognition code that causes the at least one processor to specify a plurality of character candidates through execution of character recognition from the image, for each of characters forming the character string in the character string region extracted by the character string region extraction code, wherein the plurality of character candidates are obtained for each character of the character string;

character candidate storage code that causes the at least one processor to extract for storing the plurality of character candidates specified by the character candidate recognition code, for each of the characters, in correspondence with the image as the specifying origin of the character candidates;

search keyword input code for inputting a search keyword;

search code that causes the at least one processor to perform a search to determine whether each of characters forming the keyword input by the keyword input code matches any of the plurality of character candidates obtained for the each character of the character string stored by the character candidate storage code, in a sequence of the keyword; and output code that causes the at least one processor to output a result of the search by the search code, based on the correspondence between the character candidates and the image stored by the character candidate storage code, wherein the character candidate recognition code that causes the at least one processor to output evaluate correctness of the character recognition on each of the character candidates specified in the character recognition and ranks each of the character candidates obtained for the same character based on the evaluated correctness, wherein the character candidate storage code that causes the at least one processor to store the character candidates, based on information indicative of the correctness evaluated by the character candidate recognition code, wherein the search code is configured so that when each of the characters forming the keyword matches any of the plurality of character candidates stored by the character candidate storage code, the search code that causes the at least one processor to evaluate reliability on the match based on a ranking of the matched character candidate, and determines a number of character candidates to be compared with each character of the keyword according to a number of the characters of the keyword, and determines character candidates to be judged on the match with the keyword having the determined number of character candidates, from the information indicative of the correctness on the character candidates, and wherein the output code that causes the at least one processor to output the result of the search, also based on the reliability.

19. An information processing device comprising:

an image database for storing an image as a search target;

at least one memory operable to store program code;

at least one processor operable to read said program code and operate as instructed by said program code, said program code including:

character string region extraction code that causes the at least one processor to extract a character string region including a character string in the image stored in the image database;

character candidate recognition code that causes the at least one processor to specify a plurality of character candidates through execution of character recognition from the image, for each of characters forming the character string in the character string region extracted by the character string region extraction code, wherein the plurality of character candidates are obtained for each character of the character string;

character candidate storage code that causes the at least one processor to store a character string consisting of a combination of some of the plurality of character candidates specified by the character candidate recognition code, in correspondence with the image as the specifying origin of the character candidates;

search keyword input code that causes the at least one processor to input a search keyword;

search code that causes the at least one processor to perform a search to determine whether each of characters forming the keyword input by the keyword input code matches any of character strings stored by the character candidate storage code, in a sequence of the keyword; and output code that causes the at least one processor to output a result of the search by the search code, based on the correspondence between the character string and the image stored by the character candidate storage code, wherein the character candidate recognition code that causes the at least one processor to evaluate correctness of the character recognition on each of the character candidates specified in the character recognition and ranks each of the character candidates obtained for the same character based on the evaluated correctness, wherein the character candidate storage code that causes the at least one processor to store the character string, based on information indicative of the correctness evaluated by the character candidate recognition code, wherein the search code is configured so that when each of the characters forming the keyword matches any of the character strings stored by the character candidate storage code, the search code that causes the at least one processor to evaluate reliability on the match based on a ranking of the matched character candidate, and determines a number of character candidates to be compared with each character of the keyword according to a number of the characters of the keyword, and determines character string to be judged on the match with the keyword having the determined number of character candidates, from the information indicative of the correctness on the character candidates, and wherein the output code that causes the at least one processor to output the result of the search, also based on the reliability.

20. A non-transitory computer-readable recording medium that has recorded an information processing program to make at least one computer function as:

an image database for storing an image as a search target;

at least one memory operable to store program code;

at least one processor operable to read said program code and operate as instructed by said program code, said program code including:

character string region extraction code that causes the at least one processor to extract a character string region including a character string in the image stored in the image database;

character candidate recognition code that causes the at least one processor to specify a plurality of character candidates through execution of character recognition from the image, for each of characters forming the character string in the character string region extracted by the character string region extraction code, wherein the plurality of character candidates are obtained for each character of the character string;

character candidate storage code that causes the at least one processor to store the plurality of character candidates specified by the character candidate recognition code, in correspondence with the image as the specifying origin of the character candidates;

search keyword input code that causes the at least one processor to input a search keyword;

search code that causes the at least one processor to perform a search to determine whether each of characters forming the keyword input by the keyword input code matches any of the plurality of character candidates obtained for the each character of the character string stored by the character candidate storage code, in a sequence of the keyword; and output code that causes the at least one processor to output a result of the search by the search code, based on the correspondence between the character candidates and the image stored by the character candidate storage code, wherein the character candidate recognition code that causes the at least one processor to evaluate correctness of the character recognition on each of the character candidates specified in the character recognition and ranks each of the character candidates obtained for the same character based on the evaluated correctness, wherein the character candidate storage code that causes the at least one processor to store the character candidates, based on information indicative of the correctness evaluated by the character candidate recognition code, wherein the search code is configured so that when each of the characters forming the keyword matches any of the plurality of character candidates stored by the character candidate storage code, the search code that causes the at least one processor to evaluate reliability on the match based on a ranking of the matched character candidate, and determines a number of character candidates to be compared with each character of the keyword according to a number of the characters of the keyword, and determines character candidates to be judged on the match with the keyword having the determined number of character candidates, from the information indicative of the correctness on the character candidates, and wherein the output code that causes the at least one processor to output the result of the search, also based on the reliability.

21. A non-transitory computer-readable recording medium that has recorded an information processing program to make at least one computer function as:

an image database for storing an image as a search target;

at least one memory operable to store program code;

at least one processor operable to read said program code and operate as instructed by said program code, said program code including:

character string region extraction code that causes the at least one processor to extract a character string region including a character string in the image stored in the image database;

character candidate recognition code that causes the at least one processor to specify a plurality of character candidates through execution of character recognition from the image, for each of characters forming the character string in the character string region extracted by the character string region extraction code, wherein the plurality of character candidates are obtained for each character of the character string;

character candidate storage code that causes the at least one processor to store a character string consisting of a combination of some of the plurality of character candidates specified by the character candidate recognition code, in correspondence with the image as the specifying origin of the character candidates;

search keyword input code that causes the at least one processor to input a search keyword;

search code that causes the at least one processor to perform a search to determine whether each of characters forming the keyword input by the keyword input code matches any of character strings stored by the character candidate storage code, in a sequence of the keyword; and output code that causes the at least one processor to output a result of the search by the search code, based on the correspondence between the character string and the image stored by the character candidate storage code, wherein the character candidate recognition code that causes the at least one processor to evaluate correctness of the character recognition on each of the character candidates specified in the character recognition and ranks each of the character candidates obtained for the same character based on the evaluated correctness, wherein the character candidate storage code that causes the at least one processor to store the character string, based on information indicative of the correctness evaluated by the character candidate recognition code, wherein the search code is configured so that when each of the characters forming the keyword matches any of the character strings stored by the character candidate storage code, the search code that causes the at least one processor to evaluate reliability on the match based on a ranking of the matched character candidate, and determines a number of character candidates to be compared with each character of the keyword according to a number of the characters of the keyword, and determines character string to be judged on the match with the keyword having the determined number of character candidates, from the information indicative of the correctness on the character candidates, and wherein the output code that causes the at least one processor to output the result of the search, also based on the reliability.

* * * * *